(12) United States Patent
Nishizaki

(10) Patent No.: US 7,133,627 B2
(45) Date of Patent: Nov. 7, 2006

(54) BELT DRIVER, IMAGE FORMING APPARATUS, AND METHOD THAT CAN REDUCE THE TIME UNTIL SPEED CONTROL OF A BELT IS PERFORMED

(75) Inventor: Shingo Nishizaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 115 days.

(21) Appl. No.: 10/742,059

(22) Filed: Dec. 18, 2003

(65) Prior Publication Data
US 2004/0156654 A1 Aug. 12, 2004

(30) Foreign Application Priority Data

| Dec. 20, 2002 | (JP) | ............................. 2002-370124 |
| Feb. 26, 2003 | (JP) | ............................. 2003-049674 |
| Nov. 10, 2003 | (JP) | ............................. 2003-380385 |

(51) Int. Cl.
*G03G 15/00* (2006.01)
*G03G 15/16* (2006.01)

(52) U.S. Cl. ....................................... 399/167; 399/297

(58) Field of Classification Search ................ 399/162, 399/165, 167, 297, 301; 347/116; 198/810.03
See application file for complete search history.

(56) References Cited

U.S. PATENT DOCUMENTS

| 5,452,073 A | 9/1995 | Kataoka |
| 5,523,823 A | 6/1996 | Ashikaga |
| 5,854,958 A | 12/1998 | Tanimoto et al. |
| 5,995,717 A * | 11/1999 | Tanaka ..................... 347/116 |
| 6,222,566 B1 | 4/2001 | Takeyama et al. |
| 6,282,396 B1 | 8/2001 | Iwata et al. |
| 6,317,147 B1 | 11/2001 | Tanaka |
| 6,336,019 B1 * | 1/2002 | Castelli et al. .............. 399/162 |
| 2001/0004425 A1 | 6/2001 | Shinohara et al. |
| 2002/0136570 A1 | 9/2002 | Yamanaka et al. |

FOREIGN PATENT DOCUMENTS

| DE | 10141446 A1 | 3/2002 |
| EP | 0575162 A1 | 12/1993 |
| EP | 0919882 A1 | 6/1999 |
| JP | 57120970 | 7/1982 |
| JP | 61278871 | 12/1986 |
| JP | 03260664 | 11/1991 |
| JP | 04016969 | 1/1992 |
| JP | 8-328443 | 12/1996 |
| JP | 11-249380 | 9/1999 |
| JP | 2001-51479 | 2/2001 |

* cited by examiner

*Primary Examiner*—David M. Gray
*Assistant Examiner*—Ryan Gleitz
(74) *Attorney, Agent, or Firm*—Cooper & Dunham LLP

(57) ABSTRACT

A belt driver includes a belt having a constant number of regions dividing the belt in the perimeter direction thereof. A plurality of marks have different widths in the perimeter direction and are formed in the respective regions of the belt. A sensor detects the marks on the belt. A storage part stores in advance the relationship between position information of the belt and speed variation of the belt for one rotation of the belt. Speed variation of the belt is reduced by correcting the drive speed of the belt based on the relationship. The position of the belt is detected from a time required for one of the marks to pass the sensor, and speed correction control of the belt is performed in accordance with the detected position.

15 Claims, 25 Drawing Sheets

Prior Art

BELT DRIVER, IMAGE FORMING APPARATUS, AND METHOD THAT CAN REDUCE THE TIME UNTIL SPEED CONTROL OF A BELT IS PERFORMED

BACKGROUND OF THE INVENTION

1. Field of the Invention

The present invention generally relates to image forming apparatuses and to belt drivers that perform speed correction control of belts, such as carrying belts and transfer belts.

2. Description of the Related Art

In these days, based on the requirements of the marketplace, there are many electrophotographic apparatuses that output color images, such as color copying apparatuses and color printers. Especially nowadays, it is expected for electrophotographic apparatuses forming full-color images to achieve the speed as fast as that of electrophotographic apparatuses forming black-and-white images. Thus, mainstream printers are printers that are provided with a developing apparatus for each of a plurality of photo conductors, form a monochrome toner image on each of the photo conductors, sequentially superimpose the monochrome toner images, and transfer the images to paper so as to record a color image thereon.

Tandem printers include direct transfer printers and indirect transfer printers. As shown in FIG. 1, in a direct transfer printer, images of respective colors formed on photo conductors 2K, 2M, 2C and 2Y by image forming means 1K, 1M, 1C and 1Y are sequentially superimposed on paper that is carried by a transfer belt 4 by transfer apparatuses 3K, 3M, 3C and 3Y, respectively. As shown in FIG. 2, in an indirect transfer printer, images of respective colors formed on photo conductors 5K, 5M, 5C and 5Y are sequentially superimposed on a transfer belt 7 by transfer apparatuses 6K, 6M, 6C and 6Y, respectively. Then, the images on the transfer belt 7 are simultaneously transferred to paper by a secondary transfer apparatus 8.

In each of the direct transfer printer and the indirect transfer printer, the images of the respective colors are transferred to the transfer belt 4(7) at different positions thereon. Thus, image data of the respective colors are output to the image forming means 1K, 1M, 1C and 1Y with respective delays corresponding to the intervals among the photo conductors. For this reason, when the moving speed of the transfer belt 4(7) is not constant, a shift occurs to the transfer positions to which the images of the respective colors are to be transferred. As a result, color shift occurs with the formed image. Therefore, it is necessary for tandem electrophotographic apparatuses to control with a high accuracy the speed of the transfer belt such that it is constant at all times.

However, it is structurally difficult for the transfer belt 4(7), which is used here, to realize a uniform thickness. Especially, the thickness variation tends to be generated in the longitudinal direction (direction of movement). In a case where the thickness of the transfer belt 4(7) is not uniform, even if the rotating speed of a drive shaft driving the transfer belt 4(7) is controlled to be constant, periodic speed variation occurs in the surface speed of the transfer belt 4(7). For this reason, tandem printers have a problem in that shifts occur in the transfer positions to which images of respective colors are to be transferred, which tends to result in out of color registration of a formed image.

In order to correct the speed variation that is synchronized with the rotation period of the transfer belt, a method is conceived which measures in advance the thickness variation or the speed variation for one rotation of the transfer belt, and corrects the rotating speed of the drive shaft of the transfer belt or the write timings of respective colors based on the information, so as to reduce the speed variation of the transfer belt. However, it is impossible to correct the speed of the transfer belt unless it is determined which position of the transfer belt is being driven. Hence, a method is conceived that marks a home position mark 11 representing a reference point on the transfer belt 4(7) as shown in FIG. 3, and detects the home position mark 11 by a sensor 12 as shown in FIG. 4, so as to detect a home position (hereinafter referred to as a "HP") of the transfer belt 4(7).

When forming an image, it is possible to control the speed of the transfer belt 4(7) by starting the running of the transfer belt 4(7), thereafter starting a detecting process of the home position mark 11 by the sensor 12, and, when the home position mark 11 on the transfer belt 4(7) is detected by the sensor 12, starting a speed correction control of the transfer belt 4 (7) based on speed correction data that are prepared in advance (refer to Japanese Laid-Open Patent Application No. 8-328443, for example).

Japanese Laid-Open Patent Application No. 2001-51479 describes an image forming apparatus that includes: a plurality of image forming means; an endless movable body that places and conveys a recording medium such that respective images formed by the plurality of image forming means are transferred to the recording medium at the transfer positions; a position detecting means for detecting a placing position at which the recording medium is placed on the endless movable body; and correcting means for correcting the image formation timings of the plurality of image forming means based on a detection output of the position detecting means.

Japanese Laid-Open Patent Application No. 11-249380 describes a color image forming apparatus that forms a color image on a recording medium by sequentially superimposing and transferring, to the recording medium carried by the carrying belt, images formed by a plurality of electronic process parts, including image carriers, arranged along a carrying belt. The color image forming apparatus includes: a light emitting element illuminating the carrying belt; a slit through which the light transmitted through or reflected by the carrying belt passes; a light receiving element receiving the light that passes through the slit; a shift amount detector for detecting a position shift amount of a detection pattern, the shift amount detector having means for processing a signal from the light receiving element; pattern forming means for activating each of the electronic process parts such that the same electronic process part forms a plurality of pairs of toner marks as the position shift amount detection pattern for each color with the shape corresponding to the slit, each pair including two toner marks of the same color and the same shapes, one toner mark of the pair is distant from the other toner mark for the half peripheral length of the image carrier, and adjacent toner marks among the plurality of pairs of toner marks are formed with a predetermined distance (hereinafter referred to as a "mark pitch") therebetween. The toner marks formed by the pattern forming means are detected by the shift amount detector. The shift amounts among respective images formed by the electronic process parts are detected. Among the plurality of pairs of toner marks, when focusing attention to the first formed toner mark (hereinafter referred to as a "reference mark") of two toner marks constituting a pair of toner marks formed by a predetermined reference color, a toner mark for correction (hereinafter referred to as a "correction mark") is formed while setting the target to the position that is distant for one peripheral length of the image carrier that forms the reference mark. The correction mark is also the target to be detected by the shift amount detector.

In tandem printers, the peripheral length of the transfer belt 4 (7) becomes structurally long. Thus, depending on the stop position of the transfer belt 4(7), there is a problem in that it takes a long time for the sensor 12 to detect the home position mark 11 on the transfer belt 4(7) after the rotation of the transfer belt 4(7) is resumed when an image forming process is started, which results in a long time until an image is formed.

In order to make the time shorter in which the sensor 12 detects the home position mark 11 on the transfer belt 4(7) after the rotation of the transfer belt 4(7) is resumed when the image forming process is started, a method is conceived in which the home position mark 11 on the transfer belt 4(7) is detected by the sensor 12 at the time the transfer belt 4(7) is stopped, and the transfer belt 4(7) is stopped such that the home position mark 11 always comes immediately before the sensor 12 based on a detected signal. However, this method has a problem in that the life of the transfer belt is shortened since the transfer belt is rotated more than necessary. Additionally, the method has another problem in that, when the apparatus is stopped since, for example, the cover is opened or a jam occurs while forming an image, it is impossible to set the stop position of the transfer belt to a predetermined position.

Therefore, it is desired to perform speed control of the transfer belt by detecting the current relative position of the transfer belt as quickly as possible after an image forming process is started, irrespective of the stop position of the transfer belt.

SUMMARY OF THE INVENTION

It is a general object of the present invention to provide an improved and useful belt driver and an image forming apparatus in which one or more of the above-mentioned problems are eliminated.

A more specific object of the present invention is to provide a belt driver capable of reducing the time required until speed control of a belt is performed.

A further object of the present invention is to provide an image forming apparatus capable of reducing the time required until speed control of a belt is performed and reducing the time required to form a first image.

In order to achieve the above-mentioned objects, according to one aspect of the present invention, there is provided a belt driver including:

a belt having a constant number of regions dividing the belt in a perimeter direction thereof;

a plurality of marks having different widths in the perimeter direction and formed in the respective regions of the belt;

a sensor detecting the marks on the belt; and a storage part storing in advance a relationship between position information of the belt and speed variation of the belt for one rotation of the belt, wherein speed variation of the belt is reduced by correcting drive speed of the belt based on the relationship, and wherein a position of the belt is detected from a time required for one of the marks to pass the sensor, and speed correction control of the belt is performed in accordance with the detected position.

Additionally, according to another aspect of the present invention, there is provided an image forming apparatus including the above-mentioned belt driver.

Additionally, according to anther aspect of the present invention, there is provided a belt driver including:

a belt having a constant number of regions dividing the belt in a perimeter direction thereof;

a plurality of marks formed in the respective regions of the belt, the marks each being constituted by one or more lines of a number indicating a corresponding one of the regions,;

a sensor detecting the marks on the belt; and a storage part storing in advance a relationship between position information of the belt and speed variation of the belt for one rotation of the belt, wherein speed variation of the belt is reduced by correcting drive speed of the belt based on the relationship, and wherein a position of the belt is detected by counting the number of lines of one of the marks in a corresponding one of the regions from a detected signal of the sensor, and speed correction control of the belt is performed in accordance with the detected position.

Additionally, according to another aspect of the present invention, there is provided an image forming apparatus including the above-mentioned belt driver.

Additionally, according to another aspect of the present invention, there is provided a belt driver including:

a belt having a constant number of regions dividing the belt in a perimeter direction thereof;

a plurality of linear marks having different width in a main scan direction and formed in the respective regions of the belt;

a sensor detecting the marks on the belt; and a storage part storing in advance a relationship between position information of the belt and speed variation of the belt for one rotation of the belt, wherein speed variation of the belt is reduced by correcting drive speed of the belt based on the relationship, and wherein a position of the belt is detected by comparing a predetermined value with a detected value of the sensor, and speed correction control of the belt is performed in accordance with the detected position.

Additionally, according to another aspect of the present invention, there is provided an image forming apparatus including the above-mentioned belt driver.

Additionally, according to another aspect of the present invention, there is provided a belt driver including:

a belt;

one or more marks on the belt;

a plurality of sensors that detects the marks on the belt; and a storage part storing in advance a relationship between position information of the belt and speed variation of the belt for one rotation of the belt, wherein speed variation of the belt is reduced by correcting drive speed of the belt based on the relationship, and wherein a position of the belt is detected by detecting one of the marks by one of the sensors, and speed correction control of the belt is performed in accordance with the detected position.

Additionally, according to another aspect of the present invention, there is provided an image forming apparatus including the above-mentioned belt driver.

Additionally, according to another aspect of the present invention, there is provided a belt driver including:

a belt;

a home position mark provided on the belt;

a detecting part that detects the home position mark;

a measuring part that measures a variation relating to a moving amount of the belt;

a temporary storage memory that stores position information of a stop position of the belt; and a storage part storing in advance a relationship between position information of the belt and speed variation of the belt for one rotation of the belt, wherein speed variation of the belt is reduced by correcting drive speed of the belt based on the relationship, and wherein the stop position of the belt is calculated by measuring, by the measuring means, the variation until the belt is stopped since the home position mark is detected by the detecting part, the position information in the temporary storage memory is updated by the calculated position information, and, at the time of next activation, speed control of the belt is performed in accordance with the updated position information.

Additionally, according to another aspect of the present invention, there is provided an image forming apparatus including the above-mentioned belt driver.

Additionally, according to another aspect of the present invention, there is provided a method of driving a belt that includes the steps of:

forming a constant number of regions on the belt, the regions dividing the belt in a perimeter direction thereof;

forming a plurality of marks having different widths in the perimeter direction in the respective regions of the belt;

detecting the marks on the belt by a sensor;

storing in advance a relationship between position information of the belt and speed variation of the belt for one rotation of the belt, reducing speed variation of the belt by correcting drive speed of the belt based on the relationship, and detecting a position of the belt from a time required for one of the marks to pass the sensor, and performing speed correction control of the belt in accordance with the detected position.

Additionally, according to another aspect of the present invention, there is provided a method of driving a belt that includes the steps of:

forming a constant number of regions on the belt, the regions dividing the belt in a perimeter direction thereof;

forming a plurality of marks in the respective regions of the belt, the marks each being constituted by one or more lines of a number indicating a corresponding one of the regions;

detecting the marks on the belt by a sensor; and storing in advance a relationship between position information of the belt and speed variation of the belt for one rotation of the belt, reducing speed variation of the belt by correcting drive speed of the belt based on the relationship, and detecting a position of the belt by counting the number of lines of one of the marks in a corresponding one of the regions from a detected signal of the sensor, and performing speed correction control of the belt in accordance with the detected position.

Additionally, according to another aspect of the present invention, there is provided a method of driving a belt that includes the steps of:

forming a constant number of regions on the belt, the regions dividing the belt in a perimeter direction thereof;

forming a plurality of linear marks having different widths in a main scan direction in the respective regions of the belt;

detecting the marks on the belt by a sensor; and storing in advance a relationship between position information of the belt and speed variation of the belt for one rotation of the belt, reducing speed variation of the belt by correcting drive speed of the belt based on the relationship, and detecting a position of the belt by comparing a predetermined value with a detected value of the sensor, and performing speed correction control of the belt in accordance with the detected position.

Additionally, according to another aspect of the present invention, there is provided a method of driving a belt that includes the steps of:

forming one or more marks on the belt;

detecting the marks on the belt by a plurality of sensors; and storing in advance a relationship between position information of the belt and speed variation of the belt for one rotation of the belt, reducing speed variation of the belt by correcting drive speed of the belt based on the relationship, and detecting a position of the belt by detecting one of the marks by one of the sensors, and performing speed correction control of the belt in accordance with the detected position.

Additionally, according to another aspect of the present invention, there is provided a method of driving a belt that includes the steps of:

forming a home position mark on the belt;

detecting the home position mark;

measuring a variation relating to a moving amount of the belt;

storing position information of a stop position of the belt; and storing in advance a relationship between position information of the belt and speed variation of the belt for one rotation of the belt, reducing speed variation of the belt by correcting drive speed of the belt based on the relationship, and calculating the stop position of the belt by measuring the variation until the belt is stopped since the home position mark is detected, updating the position information by the calculated position information, and, at the time of next activation, performing speed control of the belt in accordance with the updated position information.

According to the present invention, it is possible to reduce the time required until speed control of a belt is performed.

Also, it is possible to provide an image forming apparatus capable of reducing the time required for speed control of a belt and reducing the time required to form a first image.

Other objects, features and advantages of the present invention will become more apparent from the following detailed description when read in conjunction with the following drawings.

DETAILED DESCRIPTION OF THE PREFERRED EMBODIMENTS

Figure 5:
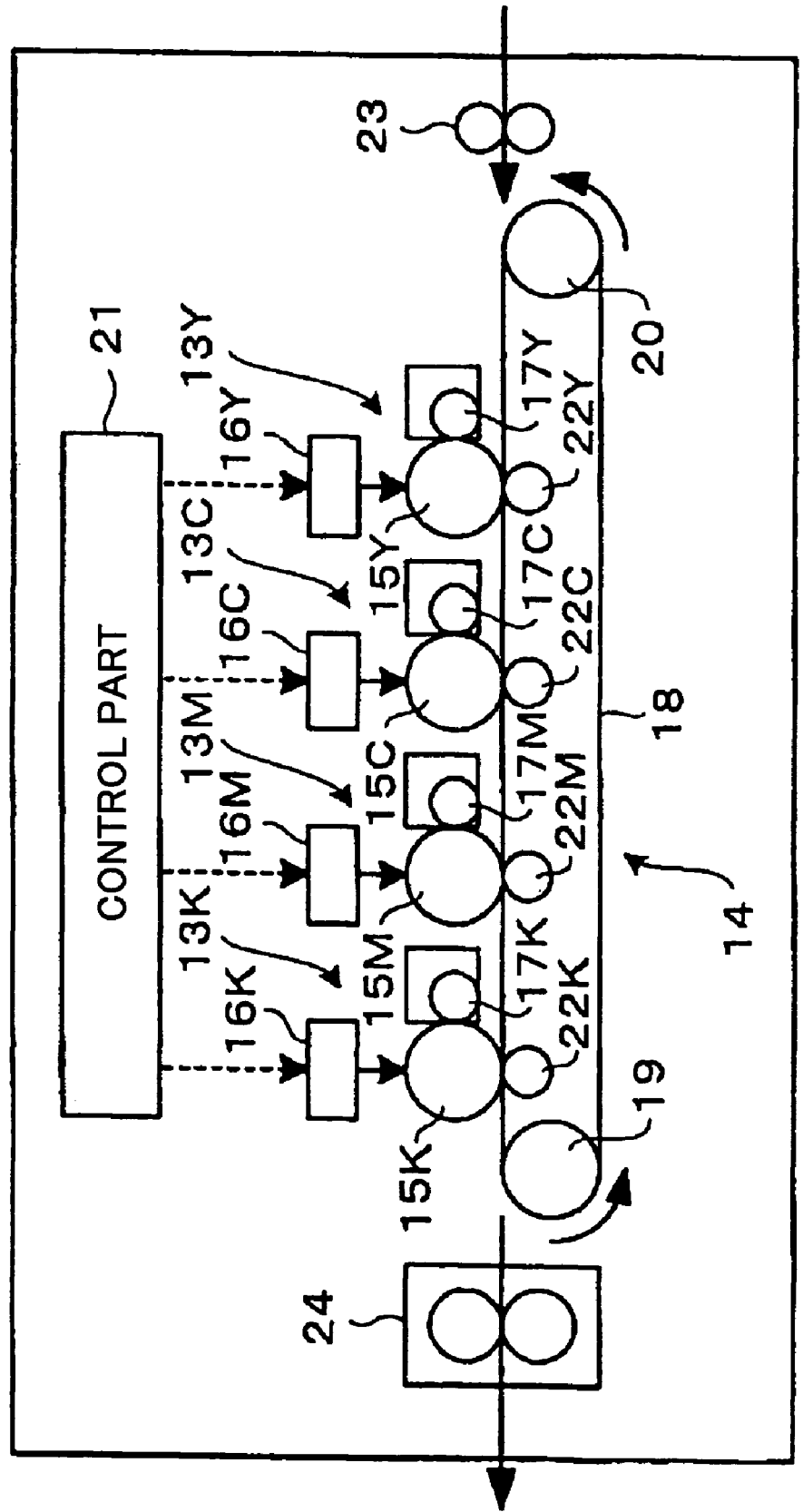
FIG. 5 is a cross-sectional view of Embodiment 1 of the present invention.

FIG. 5 shows Embodiment 1 of the present invention. Embodiment 1 is a printer serving as an image forming apparatus. The printer is a tandem color printer, which is an electrophotographic apparatus. The color printer employs a direct color system which forms a color image on paper serving as a transfer medium that is carried by a carrying apparatus 14 by sequentially transferring and superimposing images of respective colors formed by image forming units 13K, 13M, 13C and 13Y, which serve as a plurality of image forming means.

The image forming units 13K, 13M, 13C and 13Y are constituted by arranging charging apparatuses (not shown), write units 16K, 16M, 16C and 16Y serving as exposing means, developing units 17K, 17M, 17C and 17Y, and cleaning apparatuses (not shown) around drum photo conductors (photosensitive drums) 15K, 15M, 15C and 15Y serving as image carriers, respectively. The carrying apparatus 14 is constituted by an endless transfer belt 18, and a drive roller 19 and a driven roller 20 that support the transfer belt 18. The transfer belt 18 is rotated such that the drive roller 19 is driven by a transfer belt driving motor (hereinafter referred to as a "motor"), which motor is coupled to the shaft of the drive roller 19. The motor is controlled by a control part 21 such that the transfer belt 18 is rotated at a constant speed. A transfer unit is constituted by the transfer belt 18, and transfer rollers 22K, 22M, 22C and 22Y that face the photosensitive drums 15K, 15M, 15C and 15Y, respectively, via the transfer belt 18. The transfer rollers 22K, 22M, 22C and 22Y are applied with transfer bias by a power source (not shown).

Referring to FIG. 5, a description is given below of a procedure for forming a color image on paper in Embodiment 1.

First, image data are broken down into image data of respective colors, i.e., cyan (C), magenta (M), yellow (Y) and black (K), converted to write data of respective colors, and sent to the write unit 16K, 16M, 16C and 16Y serving as the exposing means by the control part 21. The write units 16K, 16M, 16C and 16Y convert the image data of respective colors, i.e., K, M, C and Y, from the control part 21 to optical signals such as laser beams, and expose the photosensitive drums 15K, 15M, 15C and 15Y, respectively, with the optical signals.

The photosensitive drums 15K, 15M, 15C and 15Y are rotated by respective drive parts (not shown) and uniformly charged by the charging apparatuses. The photosensitive drums 15K, 15M, 15C and 15Y are exposed by the optical signals such as laser beams from the write units 16K, 16M, 16C and 16Y. Thereby, electrostatic latent images corresponding to the image data of respective colors, i.e., C, M, Y and K are formed. The electrostatic latent images on the photosensitive drums 15K, 15M, 15C and 15Y are developed by the developing units 17K, 17M, 17C and 17Y with toners of K, M, C and Y, and toner images K, M, C and Y are formed, respectively.

Paper serving as a transfer medium is supplied from a paper feeder (not shown) to the transfer belt 18 via resist rollers 23. The paper is carried by the transfer belt 18, and the toner images of respective colors on the photosensitive drums 15K, 15M, 15C and 15Y are sequentially transferred and superimposed on the paper to form a color image by applying transfer bias from the power source (not shown) to the transfer belt 18 via the transfer rollers 22K, 22M, 22C and 22Y. Then, the color image is fixed to the paper by a fixing part 24, and the paper is delivered to the outside. Residual toners on the photosensitive drums 15K, 15M, 15C and 15Y are removed by the cleaning apparatuses (not shown) after the toner images are transferred, thereby preparing for the next image forming process.

The drive roller 19 is driven by the motor and thus the transfer belt 18 is rotated. The motor is controlled by the control part 21 such that the transfer belt 18 is rotated at a constant speed. When the thickness of the transfer belt 18 is not uniform, however, periodical speed variation occurs in the surface speed of the transfer belt 18. Therefore, in Embodiment 1, the relationship between position information of the transfer belt 18 and speed variation of the transfer belt 18 for one rotation is stored in storage means (storage part) in advance. The amount of speed variation of the transfer belt 18 is reduced or cancelled by correcting the drive speed of the transfer belt 18 based on the relationship. Also, marks are provided which have different widths in the peripheral length direction (moving direction) on respective regions of a predetermined number dividing the transfer belt 18, i.e., "divided regions", in the perimeter direction, and a sensor for detecting the marks on the transfer belt 18. The position of the transfer belt 18 is detected from the time required for one of the marks to pass the sensor. Speed correction control of the transfer belt corresponding to the detected position is performed.

Figure 6:
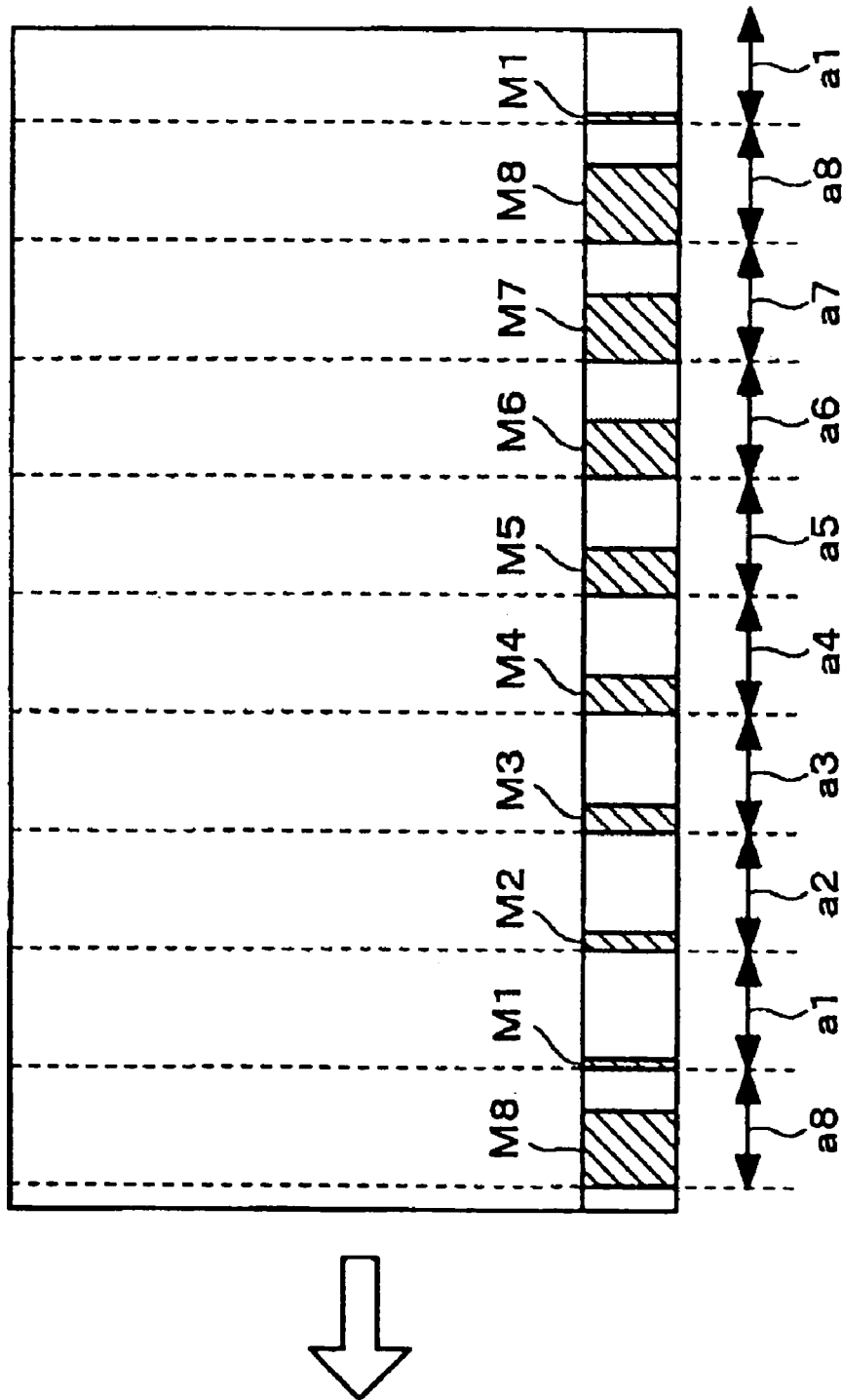
FIG. 6 is a plan view of a transfer belt in Embodiment 1 before a state where the transfer belt is formed into an endless shape by interposing both ends thereof.

FIG. 6 shows a state before both ends of the transfer belt 18 are overlapped to form the transfer belt 18 into an endless shape. The transfer belt 18 is divided into a plurality of regions, i.e., "divided regions", in the longitudinal direction (perimeter direction, i.e., moving direction), for example, eight regions a1 through a8. Marks M1 through M8, having different widths in the perimeter direction, are formed on the surfaces of the regions a1 through a8, respectively. In the illustrated exemplary embodiment, the marks M1 through M8 are formed outside the image forming region (the region corresponding to the image forming region of paper to be carried to which region a toner image is transferred) on the surface of the transfer belt 18. The marks M1 through M8 are formed in the respective regions a1 through a8 such that each mark extends in the moving direction of the transfer belt with the length of the corresponding region.

Figure 7:
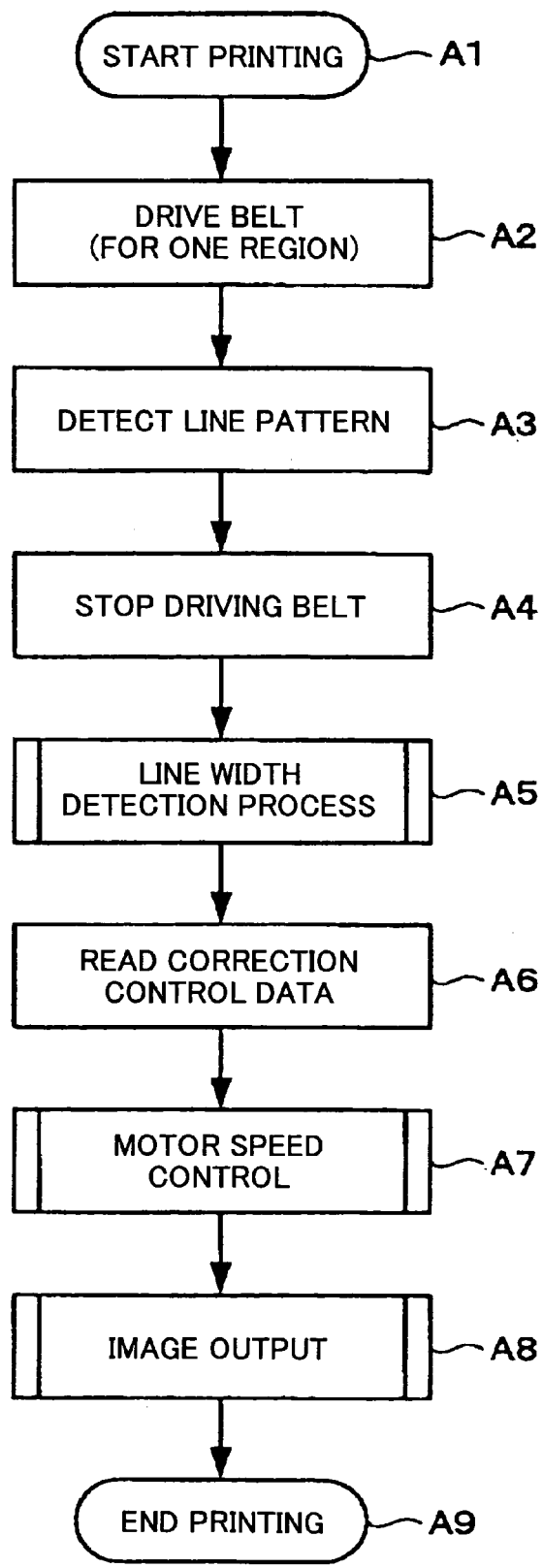
FIG. 7 is a flow chart showing an operation flow in Embodiment 1.

FIG. 7 shows an operation flow of Embodiment 1.

When an image forming (printing) start request is issued in step A1, the control part 21 drives the motor to rotate the transfer belt 18 at a constant speed for the length of one of the divided regions in step A2, then stops driving in step A4. Concurrently with the rotation of the transfer belt 18, in step A3, a HP sensor (not shown), which serves as a mark detecting sensor, detects the pattern (line pattern) of one of the marks M1 through M8 on the transfer belt 18.

The HP sensor, at a fixed position, is arranged to be able to detect the marks M1 through M8 on the transfer belt 18. As shown in FIG. 6, the patterns of the marks M1 through M8 on the transfer belt 18 are formed with different widths in the perimeter direction (moving direction) of the transfer belt 18 in the respective regions a1 through a8. The control part 21 determines the region of the transfer belt 18 that passes the HP sensor by detecting from an output signal of the HP sensor the width of the pattern of one of the marks M1 through M8 that passes the HP sensor during the rotation of the transfer belt 18.

In practice, when detecting the patterns of the marks M1 through M8 in step A3, the control part 21 performs a process for obtaining the width (line width) of one of the marks M1 through M8 (step A5) by binarizing the output signal of the HP sensor with a comparator, and measuring the time interval between the edges of the binarized signals with a timer. Based on the obtained line width, the control part 21 determines at which of the eight regions (i.e., a determined regions) of the transfer belt 18 the current position of the HP sensor is. Then, in step A6, the control part 21 reads the speed correction control data from a memory, serving as storage means, for one rotation of the transfer belt 18 with the speed correction data of the determined region as the starting point.

The memory stores in advance the relationship between position information of the transfer belt 18 and speed variation (speed correction data) of the transfer belt 18 for one rotation of the transfer belt 18. In step A7, the control part 21 starts speed control of the transfer belt 18 by controlling the speed of the motor based on the speed correction data that are read from the memory. In step A8, the control part 21 controls each part of the printer according to Embodiment 1 so that image output (image forming) is performed as mentioned above.

The correction control of speed variation that synchronizes with the period of one rotation of the transfer belt 18 is performed as follows.

The thickness variation or speed variation of the transfer belt 18 for one rotation from the reference position is measured in advance. The measured information is saved in the memory, serving as storage means, in the apparatus. The thickness variation or speed variation of the transfer belt 18 is measured by using a high-precision measuring device when assembling the apparatus. The results of the measurement are saved in the memory in the apparatus as the speed correction data.

The speed correction data are related to the positions of the regions a1 through a8 dividing the transfer belt 18. It is possible to read from the memory the speed correction data of an arbitrary region of the regions a1 through a8.

When driving the transfer belt 18, the control part 21 performs a process for reducing speed variation of the transfer belt 18 by controlling the rotation speed of the drive shaft of the transfer belt 18 (or the write timing of image data of respective colors by the write units 16K, 16M, 16C and 16Y) such that the speed variation of the transfer belt 18 is reduced or canceled based on the speed correction data.

Figure 8:
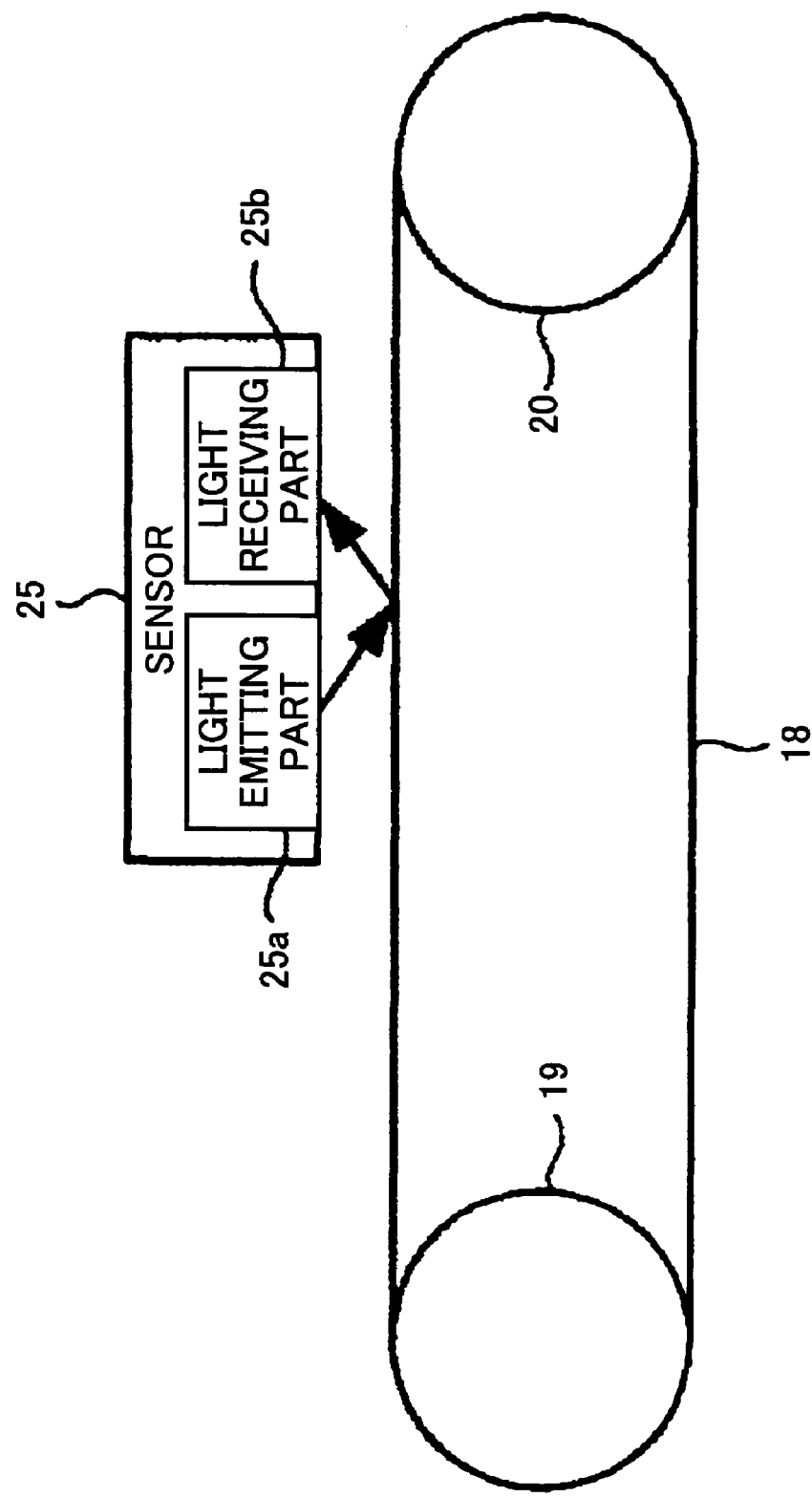
FIG. 8 is a schematic diagram showing the transfer belt and a sensor in Embodiment 1.
Figure 9:
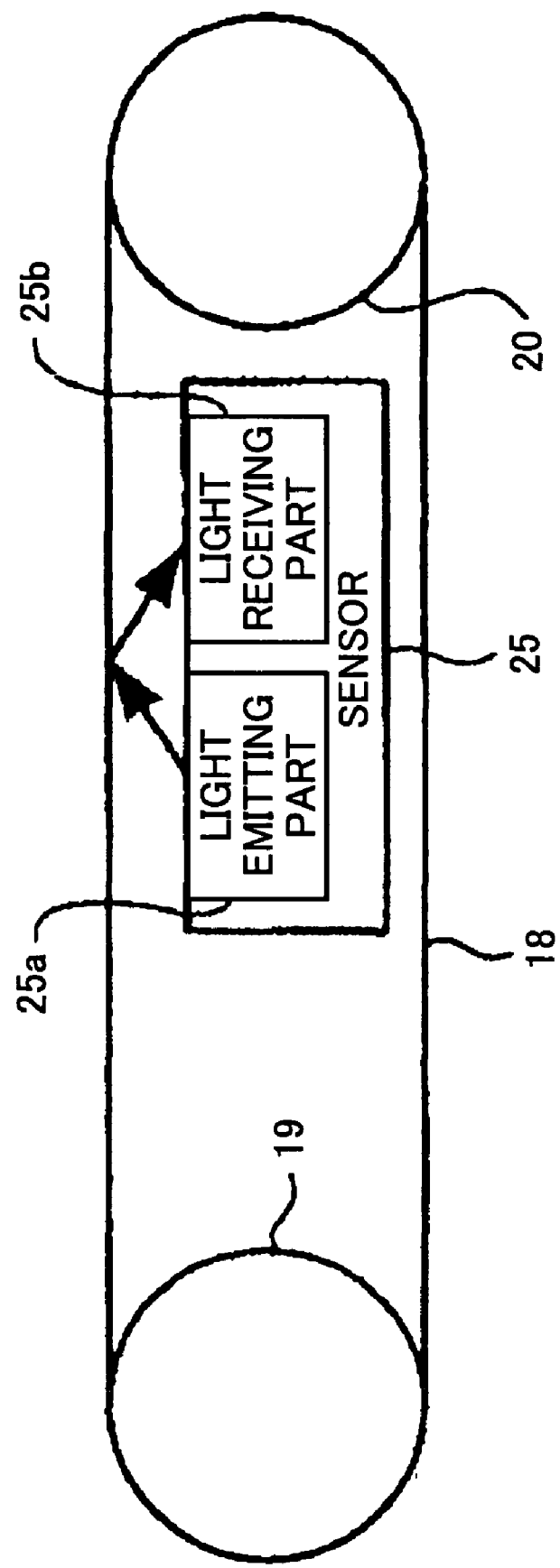
FIG. 9 is a schematic diagram showing the transfer belt and another sensor.

The description is given above that the marks M1 through M8 are formed outside the image forming region of the transfer belt 18, and the HP sensor for mark detection detects the marks M1 through M8 by a reflective sensor 25 at a fixed position facing the front or outer surface of the transfer belt 18 as shown in FIG. 8. However, as shown in FIG. 9, the marks M1 through M8 may be formed in the respective regions a1 through a8 on the back surface of the transfer belt 18, and the marks M1 through M8 may be detected by the reflective sensor 25 at a fixed position facing the back or inner surface of the transfer belt 18. The reflective sensor 25 includes a light-emitting part 25a and a light-receiving part 25b. The reflective sensor 25 illuminates end parts of the transfer belt 18 where the marks M1 through M8 are provided by means of the light-emitting part 25a, and receives the reflected light by means of the light-receiving part 25b.

Figure 10:
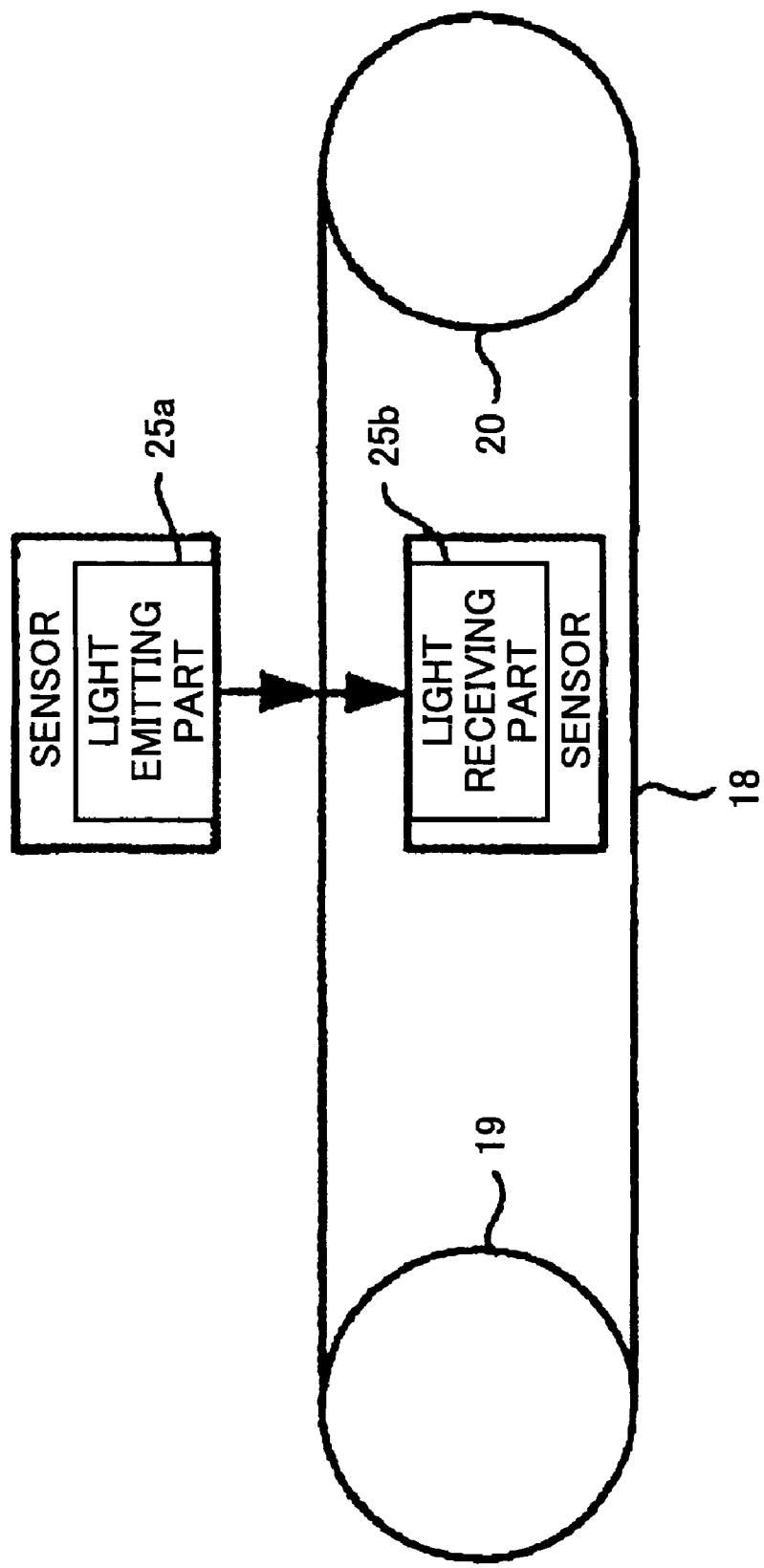
FIG. 10 is a schematic diagram showing the transfer belt and still another sensor.

Additionally, in a case where the transfer belt 18 is made of a transparent material, as shown in FIG. 10, the light-emitting part 25a and the light-receiving part 25b, constituting the HP sensor for mark detection, may be arranged to interpose the transfer belt 18 therebetween. The marks M1 through M8 may be detected by receiving, by means of the light-receiving part 25b, light that is emitted from the light emitting part 25a and is transmitted through the parts of the transfer belt 18 where the marks M1 through M8 are provided.

According to Embodiment 1, the marks M1 through M8, having different widths in the perimeter direction, are formed in the respective regions a1 through a8 of the constant number, which regions divide the transfer belt 18 in the perimeter direction. Additionally, the sensor 25 is provided that detects the marks M1 through M8 on the transfer belt 18. The position of the transfer belt 18 is detected based on the time during which one of the marks M1 through M8 passes the sensor 25, and speed correction control of the transfer belt 18 corresponding to the detected position is performed. Thus, it is possible to detect the relative position of the detected position with respect to the entire transfer belt 18 by starting running of the transfer belt 18 and detecting the mark on the surface of the transfer belt 18 only in a partial region. Hence, irrespective of the stop position of the transfer belt 18, by detecting the current relative position of the transfer belt 18 in a short time and starting the speed correction control of the transfer belt 18, it is possible to reduce the time required until speed control of the transfer belt 18 is started. Also, it is possible to realize an image forming apparatus that reduces the time to form a first image.

Figure 11:
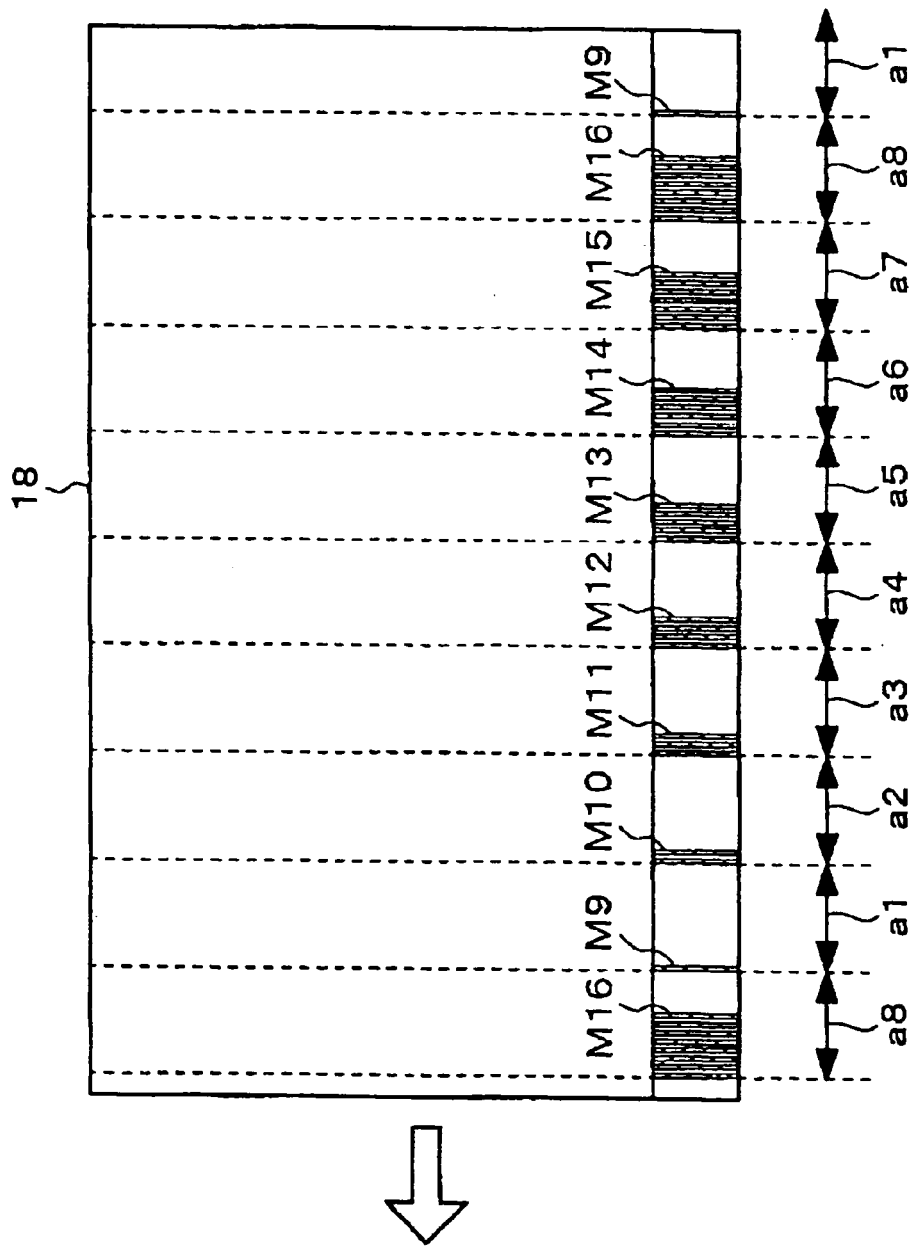
FIG. 11 is a plan view of a transfer belt in Embodiment 2 of the present invention before a state where the transfer belt is formed into an endless shape by interposing both ends thereof.
Figure 12:
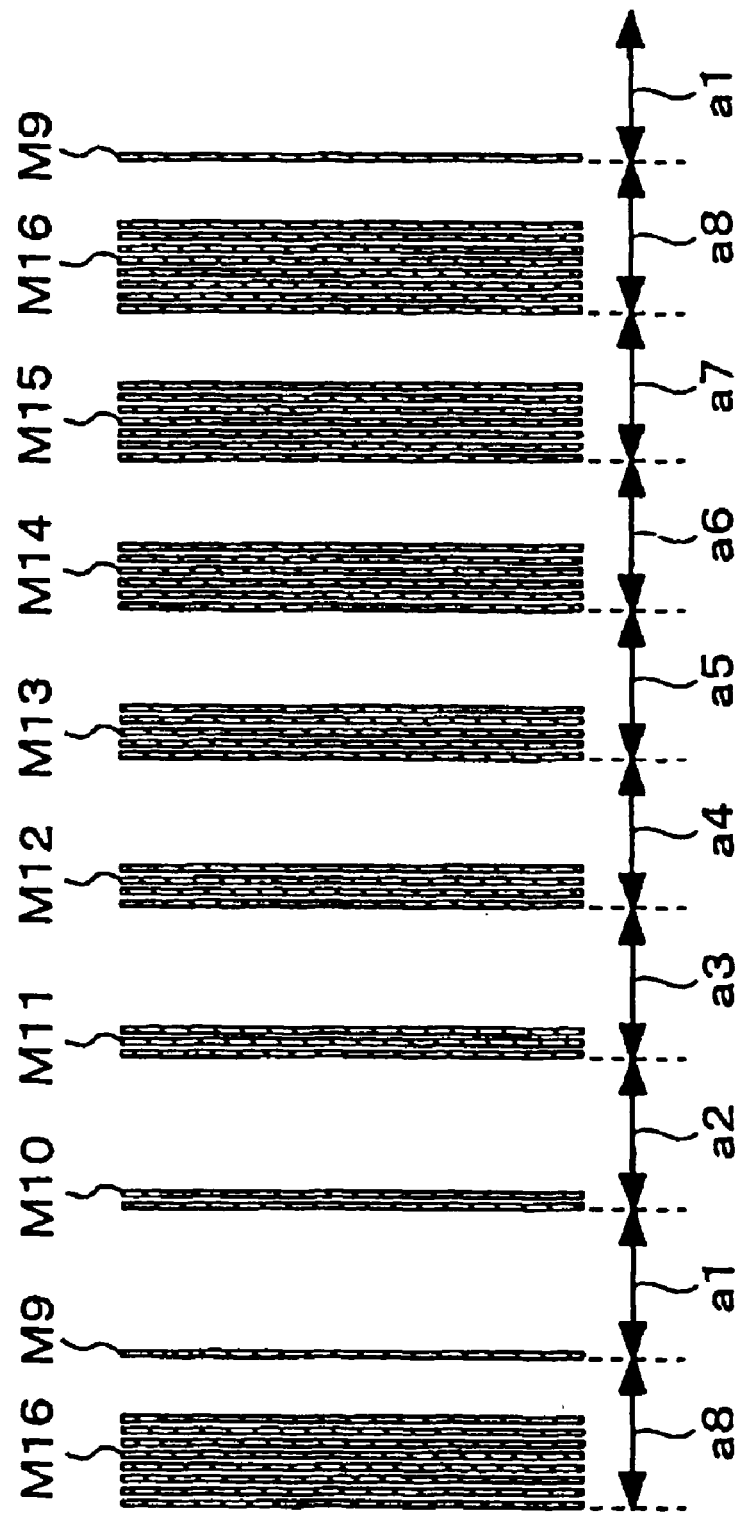
FIG. 12 is a schematic diagram showing marks on the transfer belt.

FIG. 11 shows the structure of the transfer belt 18 in Embodiment 2 of the present invention. In Embodiment 2, as shown in FIG. 12, marks M9 through M16 are formed in the regions a1 through a8, respectively, dividing the transfer belt 18 in Embodiment 1. The marks M9 through M16 are each constituted by one or more lines (vertical lines with respect to the moving direction of the transfer belt 18) of a number indicating the corresponding region. The marks M9 through M16 are formed outside the image forming region of the surface of the transfer belt 18. In the illustrated exemplary embodiment, the marks M9 through M16 are formed in the respective regions a1 through a8 such that each extends in the moving direction of the transfer belt 18 with the length of the corresponding region.

Figure 13:
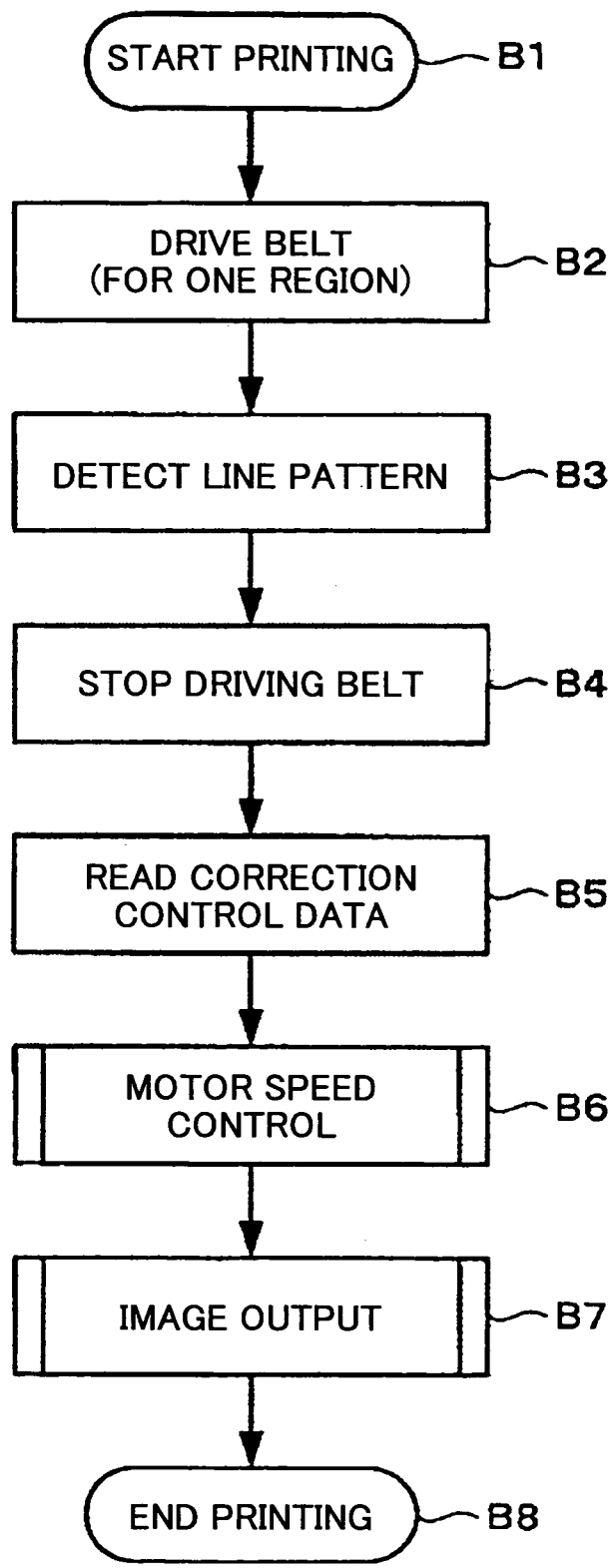
FIG. 13 is a flow chart showing an operation flow in Embodiment 2.

FIG. 13 shows an operation flow of Embodiment 2.

When an image forming (printing) start request is issued in step B1, the control part 21 first drives the motor to rotate the transfer belt 18 at a constant speed for one of the regions dividing the transfer belt 18 in step B2, and then stops driving in step B4. Concurrently with rotation of the transfer belt 18, in step B3, the HP sensor 25 detects the patterns (line patterns) of the marks M9 through M16, which are constituted by lines, on the transfer belt 18, and the control part 21 detects a mark by counting the number of lines that pass the HP sensor 25 during the rotation of the transfer belt 18 based on an output signal of the HP sensor 25.

When counting the number of lines, the control part 21 obtains the number of lines by binarizing the output signal of the HP sensor 25 with the comparator and counting the number of edges of the binarized signal. Based on the obtained number of lines, the control part 21 determines at which region (i.e., a determined region) the HP sensor 25 is among the regions a1 through a8 dividing the transfer belt 18 into 8 regions. Then, in step B5, the control part 21 reads from the memory the speed correction data for one rotation of the transfer belt 18 with the speed correction data of the determined region as the starting point. In step B6, based on the speed correction data that are read from the memory, the control part 21 starts speed control of the transfer belt 18 by speed control of the motor. In step B7, the control part 21 controls each part of the printer according to the manner set forth above with respect to Embodiment 1, for example, so that image output (image forming) is performed.

According to Embodiment 2, the marks M9 through M16, each of which is constituted by one or more lines of a number indicating the corresponding region, are formed in the respective regions a1 through a8 of a constant number dividing the transfer belt 18 in the perimeter direction. Additionally, the HP sensor 25 is provided that detects the marks M9 through M16 on the transfer belt 18. The position of the transfer belt 18 is detected by counting the number of lines of one of the marks M9 through M16 in the respective regions a1 through a8 based on a detected signal of the HP sensor 25. The speed correction of the transfer belt 18 is performed in accordance with the detected position. Thus, it is possible to detect the relative position of the detected position with respect to the entire transfer belt 18 by starting running of the transfer belt 18 and detecting the mark on the surface of the transfer belt 18 by the HP sensor 25 only in a partial region of the transfer belt 18. Hence, irrespective of the stop position of the transfer belt 18, by starting the speed correction control of the transfer belt 18 by detecting the current relative position of the transfer belt 18 in a short time, it is possible to reduce the time required until the speed control of the transfer belt 18 is started. Also, it is possible to realize an image forming apparatus that reduces the time to form a first image.

Figure 14:
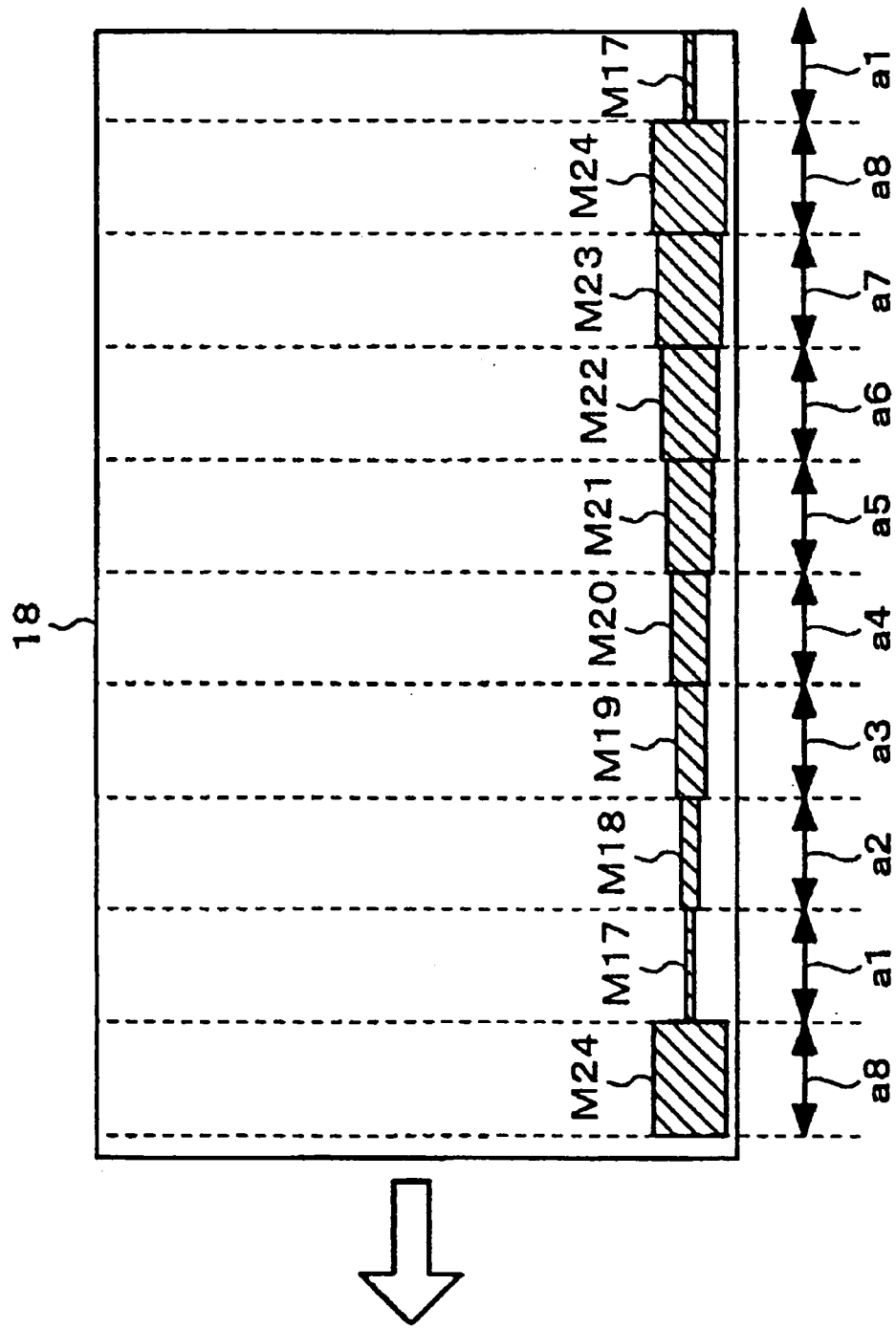
FIG. 14 is a plan view of a transfer belt in Embodiment 3 of the present invention before a state where the transfer belt is formed into an endless shape by interposing both ends thereof.

FIG. 14 shows the structure of the transfer belt 18 in Embodiment 3 of the present invention. In Embodiment 3, as shown in FIG. 14, linear marks M17 through M24, having different widths in the main scan direction that is perpendicular to the moving direction of the transfer belt 18, are formed as patterns in the respective regions a1 through a8 dividing the transfer belt 18 into eight regions in the above-mentioned Embodiment 1. In the illustrated exemplary embodiment, the marks M17 through M24 are formed outside the image forming region of the surface of the transfer belt 18. The marks M17 through M24 are formed in the respective regions a1 through a8 such that each mark extends in the moving direction of the transfer belt with the length of the corresponding region.

Figure 15:
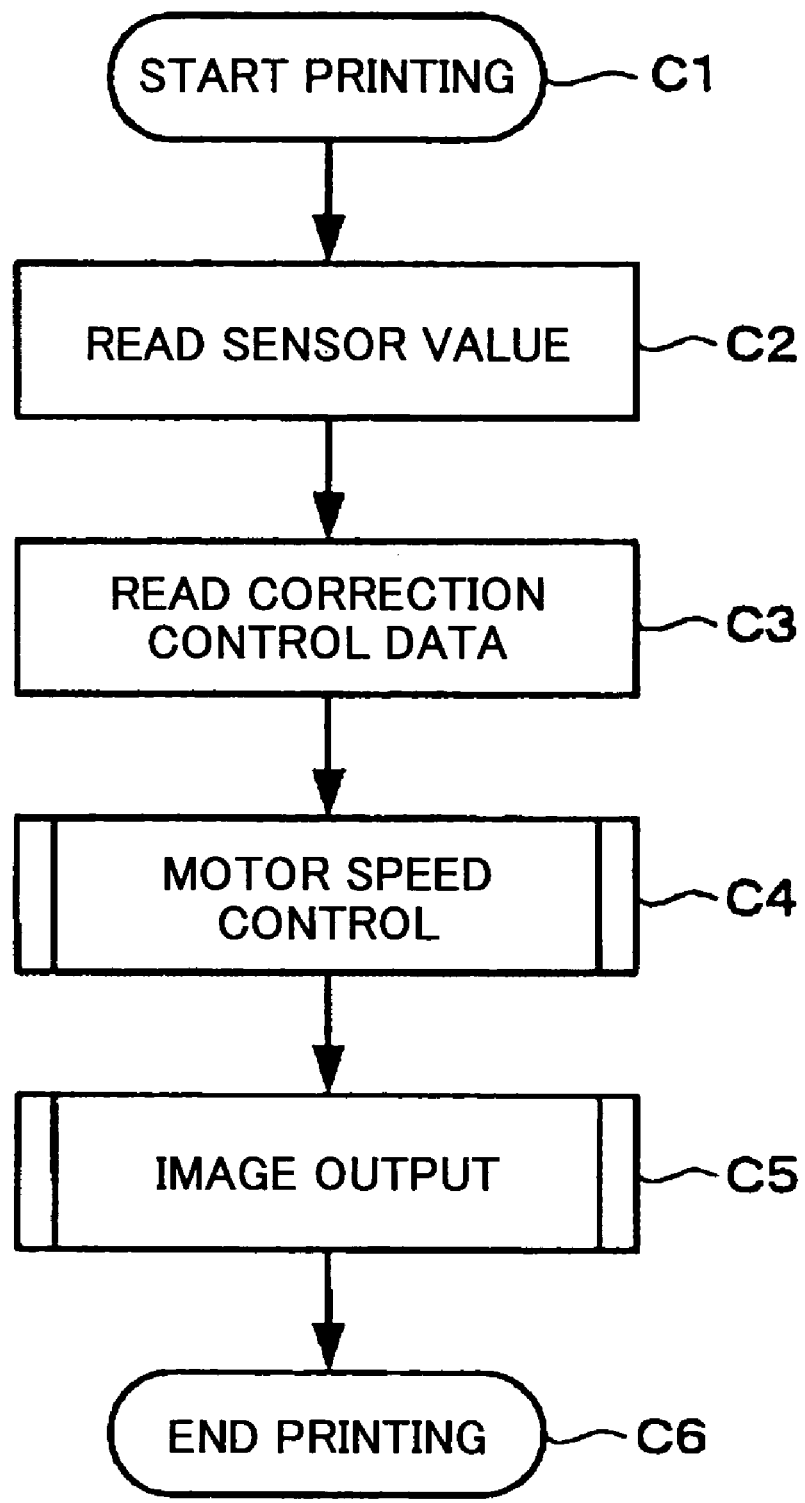
FIG. 15 is a flow chart showing an operation flow in Embodiment 3.

FIG. 15 shows an operation flow of Embodiment 3.

When an image forming start request is issued in step C1, the control part 21 causes the HP sensor 25 to measure the marks M17 through M24 on the transfer belt 18 and reads a value of the HP sensor 25 in step C2. In step C3, the control part 21 digitizes the output value of the HP sensor 25 by converting the output value into a digital value by an A/D converter (not shown). The control part 21 compares the digital value with threshold values that are set in advance, and determines at which of the regions a1 through a8, dividing the transfer belt 18 into eight regions, the current position of the HP sensor 25 is. The control part 21 reads from the memory the speed correction data for one rotation of the transfer belt 18 with the speed correction data of the determined region as the starting point. In step C4, based on the speed correction data that are read from the memory, the control part 21 starts speed control of the transfer belt 18 through speed control of the motor. In step C5, the control part 21 controls each part of the printer according to the manner set forth above with respect to Embodiment 1, for example, so that image output (image forming) is performed.

According to Embodiment 3, the linear marks M17 through M24, having the different widths in the main scan direction, are formed in the respective regions a1 through a8 of the constant number dividing the transfer belt 18 in the perimeter direction. Additionally, the HP sensor 25 is provided that detects the marks M17 through M24 on the transfer belt 18. The position of the transfer belt 18 is detected by comparing the detected value from the HP sensor 25 with a preset value. The speed correction control of the transfer belt 18 is performed in accordance with the detected position. Thus, without driving the transfer belt 18, it is possible to detect the relative position of the detected position of the transfer belt 18, which position is detected by the HP sensor 25, with respect to the entire transfer belt 18. Hence, it is possible to reduce the time required until the speed control of the transfer belt 18 is started. Also, it is possible to realize an image forming apparatus that reduces the time to form a first image.

Figure 16:
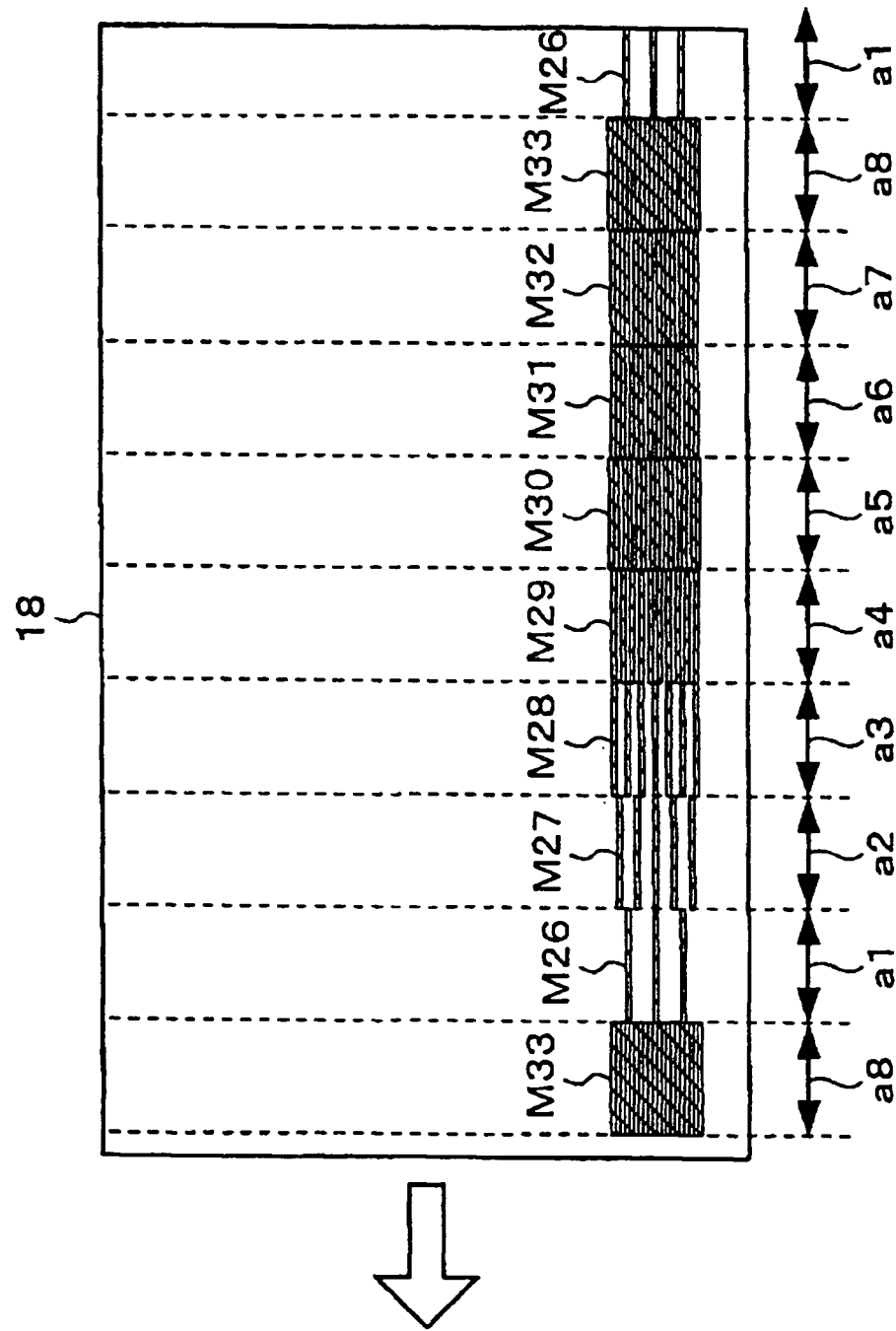
FIG. 16 is a plan view of the transfer belt in Embodiment 4 of the present invention before a state where the transfer belt is formed into an endless shape by interposing both ends thereof.
Figure 17:
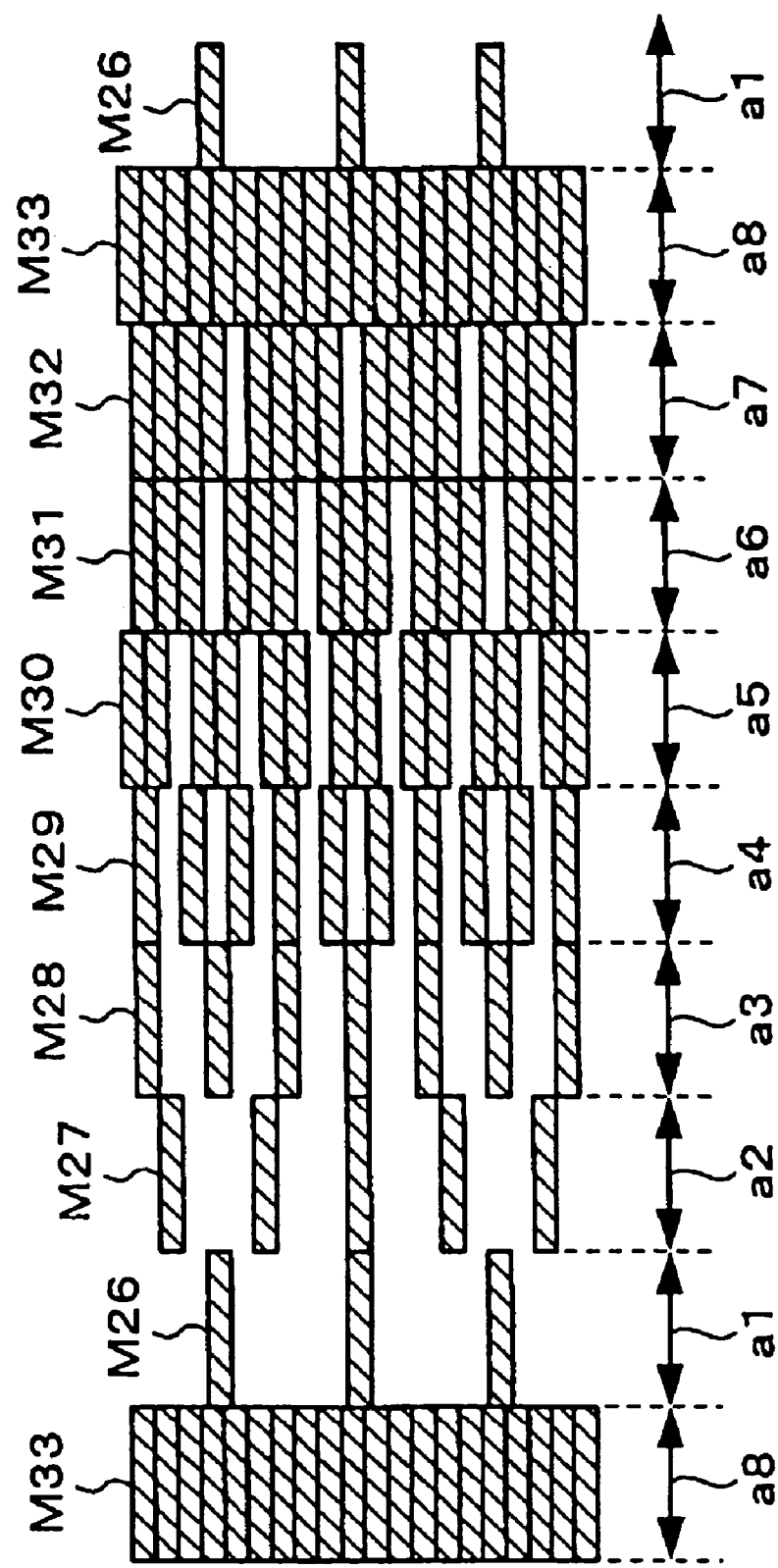
FIG. 17 is a schematic diagrams showing marks on the transfer belt.

FIG. 16 shows the structure of the transfer belt 18 in Embodiment 4 of the present invention. In Embodiment 4, as shown in FIG. 17, marks M26 through M33 are formed as patterns on the surfaces of the respective regions a1 through a8 dividing the transfer belt 18 into eight regions in Embodiment 1. The marks M26 through M33 are each formed by arranging a plurality of thin lines in parallel in the main scan direction, which is perpendicular to the moving direction of the transfer belt 18. The marks M26 through M33 each has a different number of lines in the respective regions a1 through a8. In the illustrated exemplary embodiment, the marks M26 through M33 are formed outside the image forming region of the surface of the transfer belt 18. The marks M26 through M33 are formed in the respective regions a1 through a8 such that each mark extends in the moving direction of the transfer belt 18 with the length of the corresponding region.

Figure 18:
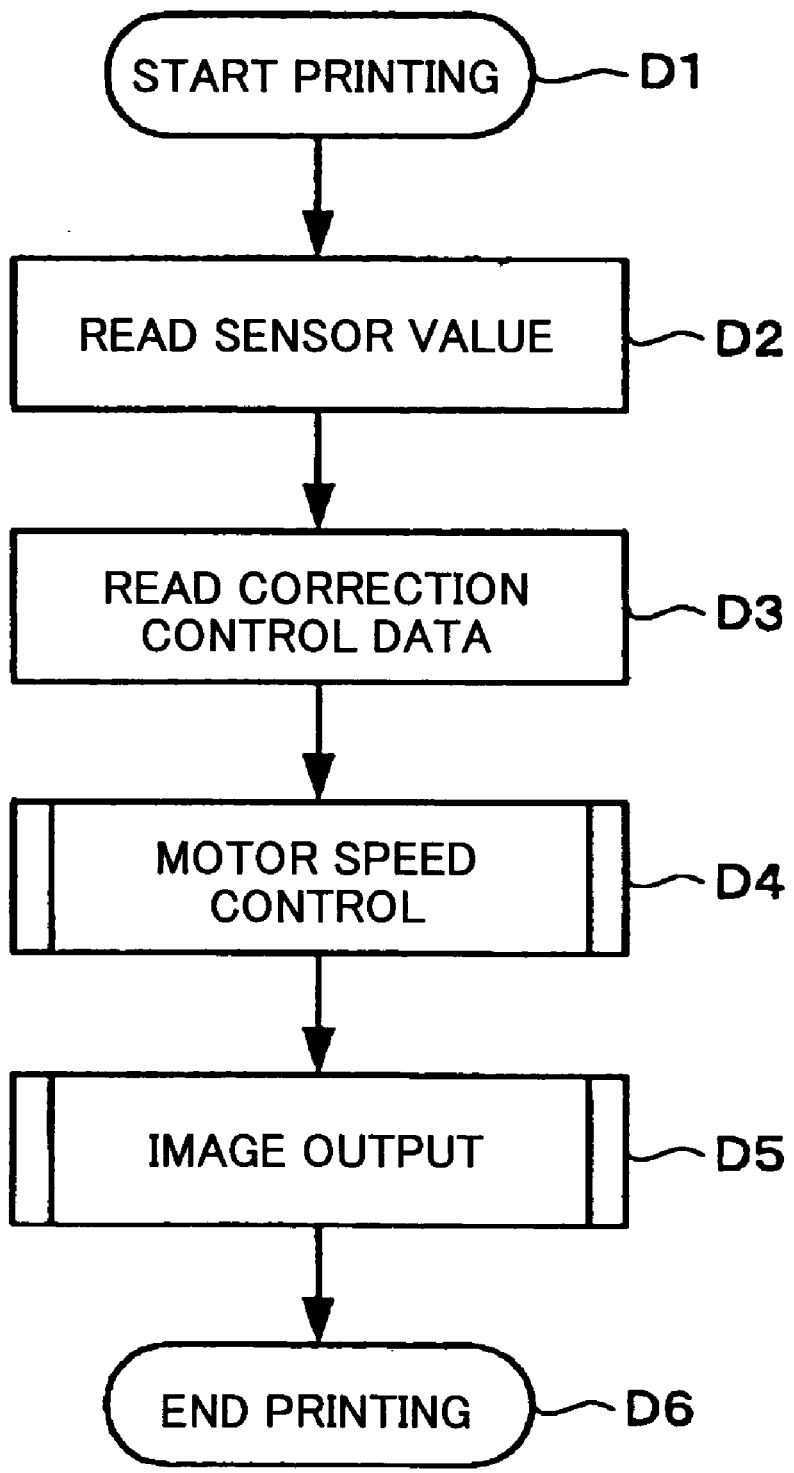
FIG. 18 is a flow chart showing an operation flow in Embodiment 4.

FIG. 18 shows an operation flow of Embodiment 4.

When an image forming start request is issued in step D1, the control part 21 causes the HP sensor 25 to measure the marks M26 through M33 on the transfer belt 18 and reads a value of the HP sensor 25 in step D2. In step D3, the control part 21 digitizes the output value of the HP sensor 25 by converting the output value into a digital value by the A/D converter. The control part 21 compares the digital value with a threshold value that is set in advance and determines at which of the regions a1 through a8, dividing the transfer belt 18 into eight regions, the current position of the HP sensor is. The control part 21 reads from the memory the speed correction data with the speed correction data of the determined region as the starting point. In step D4, based on the speed correction data that are read from the memory, the control part 21 starts speed control of the transfer belt 18 by speed control of the motor. In step D5, the control part 21 controls each part of the printer according to the manner set forth above with respect to Embodiment 1, for example so that image output (image forming) is performed.

According to Embodiment 4, the patterns of the marks M26 through M33 formed in the respective regions a1 through a8 on the transfer belt 18 are constituted by combining thin lines along the direction perpendicular to the moving direction of the transfer belt 18. Thus, without moving the transfer belt 18, it is possible to detect the relative position of the detected position of the transfer belt 18, which position is detected by the HP sensor 25, with respect to the entire transfer belt 18. Hence, it is possible to reduce the time required until the speed control of the transfer belt 18 is started. Also, it is possible to realize an image forming apparatus that reduces the time to form a first image. Further, even if the position of the transfer belt 18 is varied in the main scan direction since, for example, the transfer belt 18 is shifted, variation in the detected value of the HP sensor 25 is small. Accordingly, the possibility of erroneous detection is decreased, and thus it is possible to detect the marks more stably.

Figure 19:
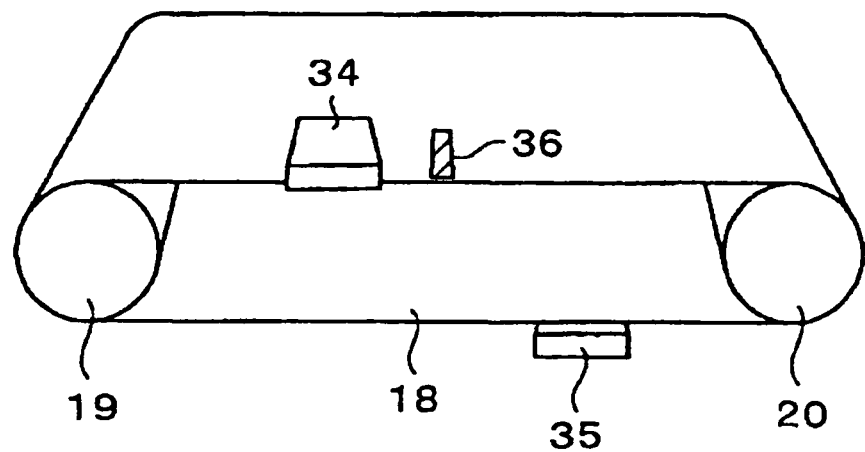
FIG. 19 is a perspective view of a sensor and a transfer belt in Embodiment 5.
Figure 20:
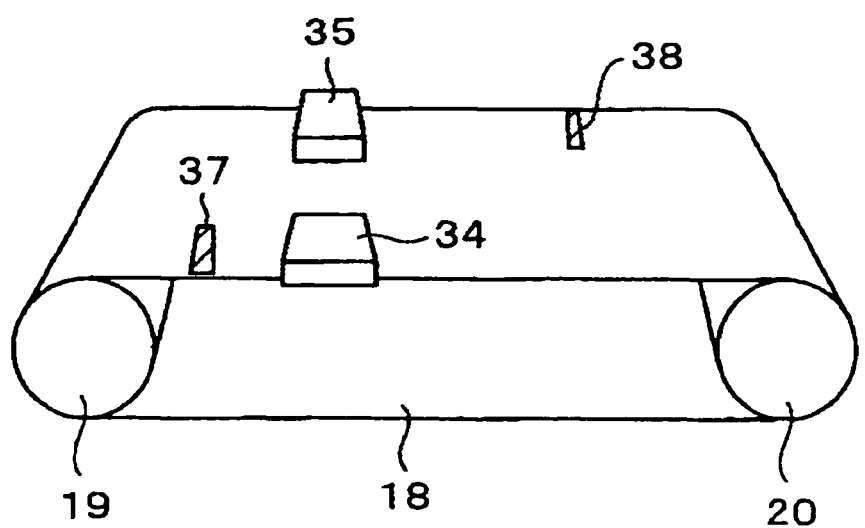
FIG. 20 is a perspective view of a sensor and a transfer belt in Embodiment 6.

FIGS. 19 and 20 show a part of Embodiments 5 and 6 of the present invention, respectively. In Embodiments 5 and 6, a plurality of, for example, two HP sensors 34 and 35 are arranged with respect to the transfer belt 18 in Embodiment 1 along the perimeter direction (rotation direction) of the transfer belt 18 with a shift of a half rotation of the transfer belt 18. It is possible to reduce the time required for detecting the marks. As shown in FIG. 19, in Embodiment 5, the two HP sensors 34 and 35 are arranged such that the mark 36 on the surface of the transfer belt 18 is detected at two different positions. In the illustrated exemplary embodiment, the mark 36 is formed outside the image forming region of the surface of the transfer belt 18.

When outputting an image, the control part 21 starts running of the transfer belt 18 at a constant speed by driving the motor. Then, the control part 21 starts a process for causing the two sensors 34 and 35 to detect the mark 36. Based on output signals of the sensors 34 and 35, when the sensor 34 detects the mark 36 earlier than the sensor 35, the control part 21 reads the speed correction data from the memory. Based on the speed correction data, the control part 21 starts speed control of the transfer belt 18 by speed control of the motor.

Additionally, based on the output signals of the sensors 34 and 35, when the sensor 35 detects the mark 36 earlier than the sensor 34, the control part 21 reads the speed correction data form the memory. The control part 21 starts speed control of the transfer belt 18 by speed control of the motor based on the speed correction data while setting the speed correction data shifted for a half rotation from the reference position of the transfer belt 18 to an initial value.

In a case where one sensor is provided, it takes at the maximum the time required for the sensor to sense almost the entire transfer belt 18 until the mark 36 on the transfer belt 18 passes the sensor. In a case where the two sensors 34 and 35 are provided, however, it is possible to halve the maximum value of time required for the sensor to detect the mark 36.

Figure 21:
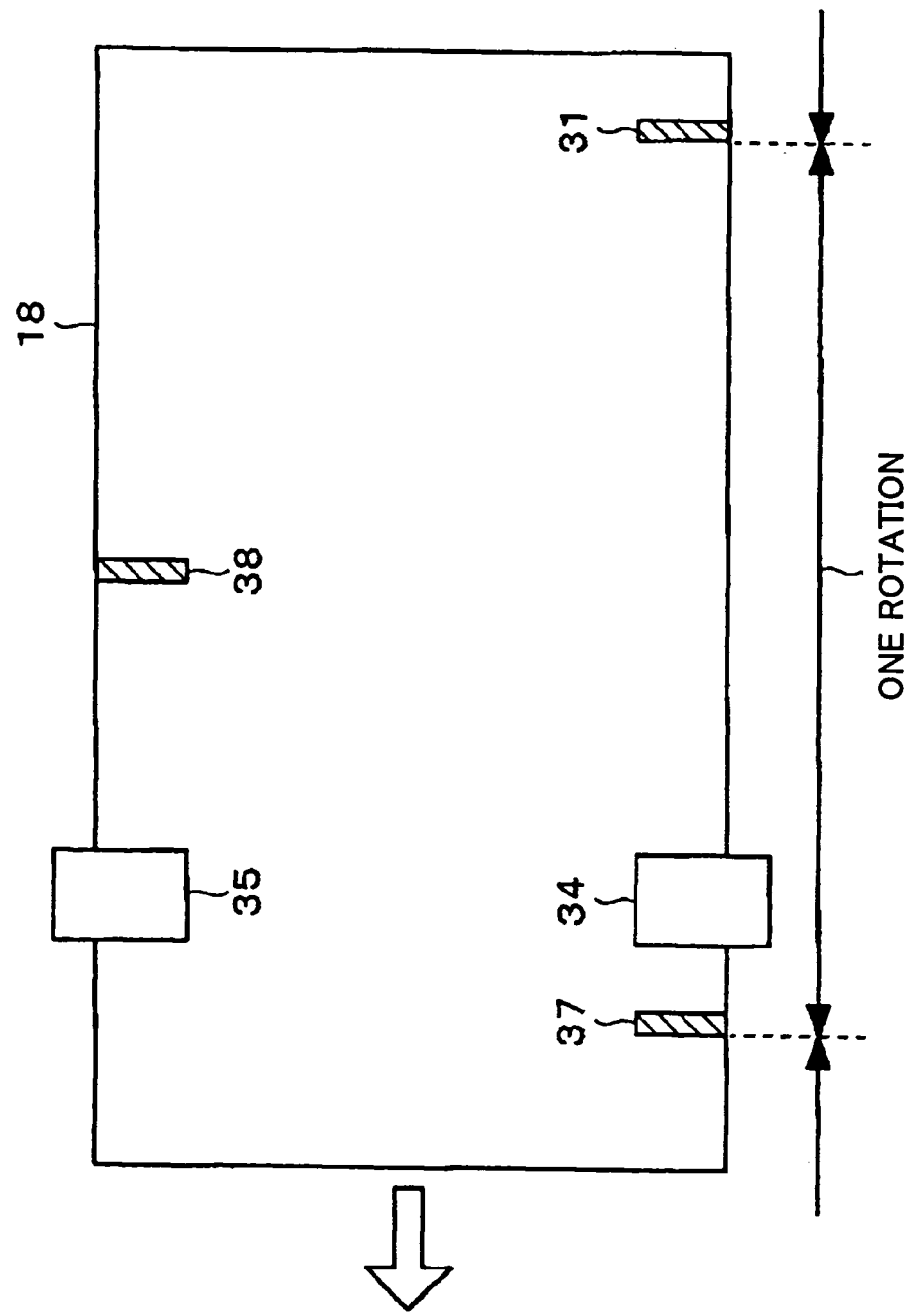
FIG. 21 is a plan view of the transfer belt in Embodiment 6 of the present invention before a state where the transfer belt is formed into an endless shape by interposing both ends thereof.

As shown in FIG. 20, in Embodiment 6, the two sensors 34 and 35 are arranged at the opposing ends of the outside of the image forming region of the transfer belt 18. As shown also in FIG. 21, two marks 37 and 38 are formed on the surface of the transfer belt 18 at positions that pass the sensors 34 and 35, and are shifted for a ½ period in the perimeter direction (moving direction) of the transfer belt 18. In the illustrated exemplary embodiment, the marks 37 and 38 are formed outside the image forming region of the surface of the transfer belt 18.

When outputting an image, the control part 21 starts running of the transfer belt 18 at a constant speed by driving the motor. Then, the control part 21 starts a process for causing the two sensors 34 and 35 to detect the marks 37 and 38, respectively. Based on output signals of the sensors 34 and 35, when the sensor 34 detects the mark 37 earlier than the sensor 35 detects the mark 38, the control part 21 reads the speed correction data from the memory. Based on the speed correction data, the control part 21 starts speed control of the transfer belt 18 by speed control of the motor.

Additionally, based on the output signals of the sensors 34 and 35, when the sensor 35 detects the mark 38 earlier than the sensor 34 detects the mark 37, the control part 21 reads the speed correction data from the memory. The control part 21 starts speed control of the transfer belt 18 by speed control of the motor based on the speed correction data while setting the speed correction data shifted for a half rotation from the reference position of the transfer belt 18 to an initial value.

In a case where one sensor is provided, it takes at the maximum a time required for the sensor to sense almost the entire transfer belt 18 until the mark on the transfer belt 18 passes the sensor. In a case where the two sensors 34 and 35 are arranged, however, it is possible to halve the maximum value of time required for the sensor to detect the mark.

According to Embodiments 5 and 6, the plurality of sensors 34 and 35 for detecting the marks 36 through 38 on the transfer belt 18 are provided. The position of the transfer belt 18 is detected by detecting the marks 36 through 38 by one of the sensors 34 and 35, and the speed correction control in accordance with the detected position is performed. Thus, it is possible to detect the relative position of the detected position with respect to the entire transfer belt 18 in a short time. Hence, it is possible to reduce the time required until speed control of the transfer belt 18 is started. Also, it is possible to realize an image forming apparatus that reduces the time to form a first image.

Figure 3:
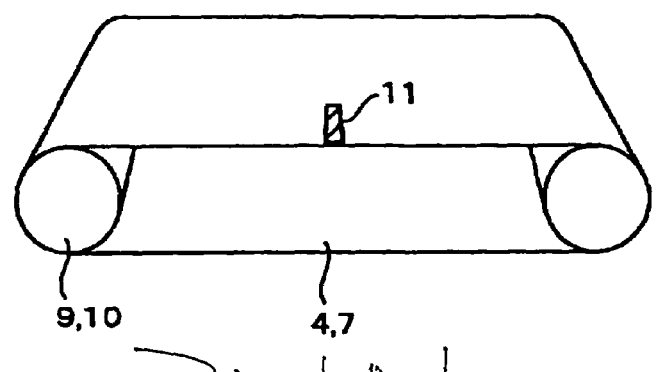
FIG. 3 is a perspective view of a transfer belt of a conventional tandem printer.
Figure 4:
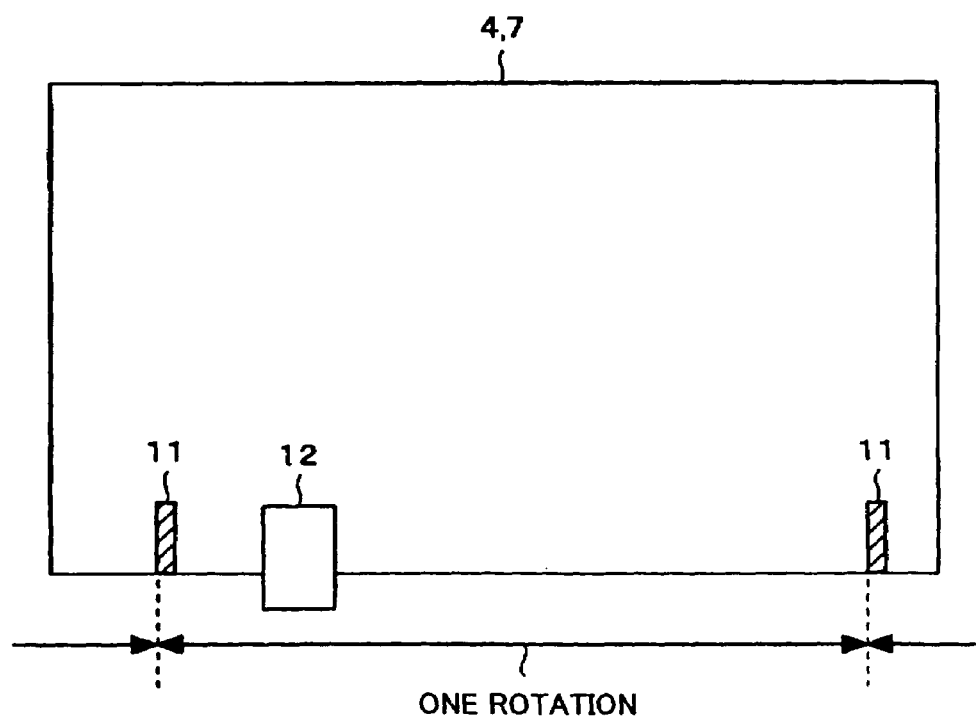
FIG. 4 is a schematic diagram showing a sensor and the transfer belt shown in FIG. 3 before a state where the transfer belt is formed into an endless shape by interposing both ends thereof.
Figure 22:
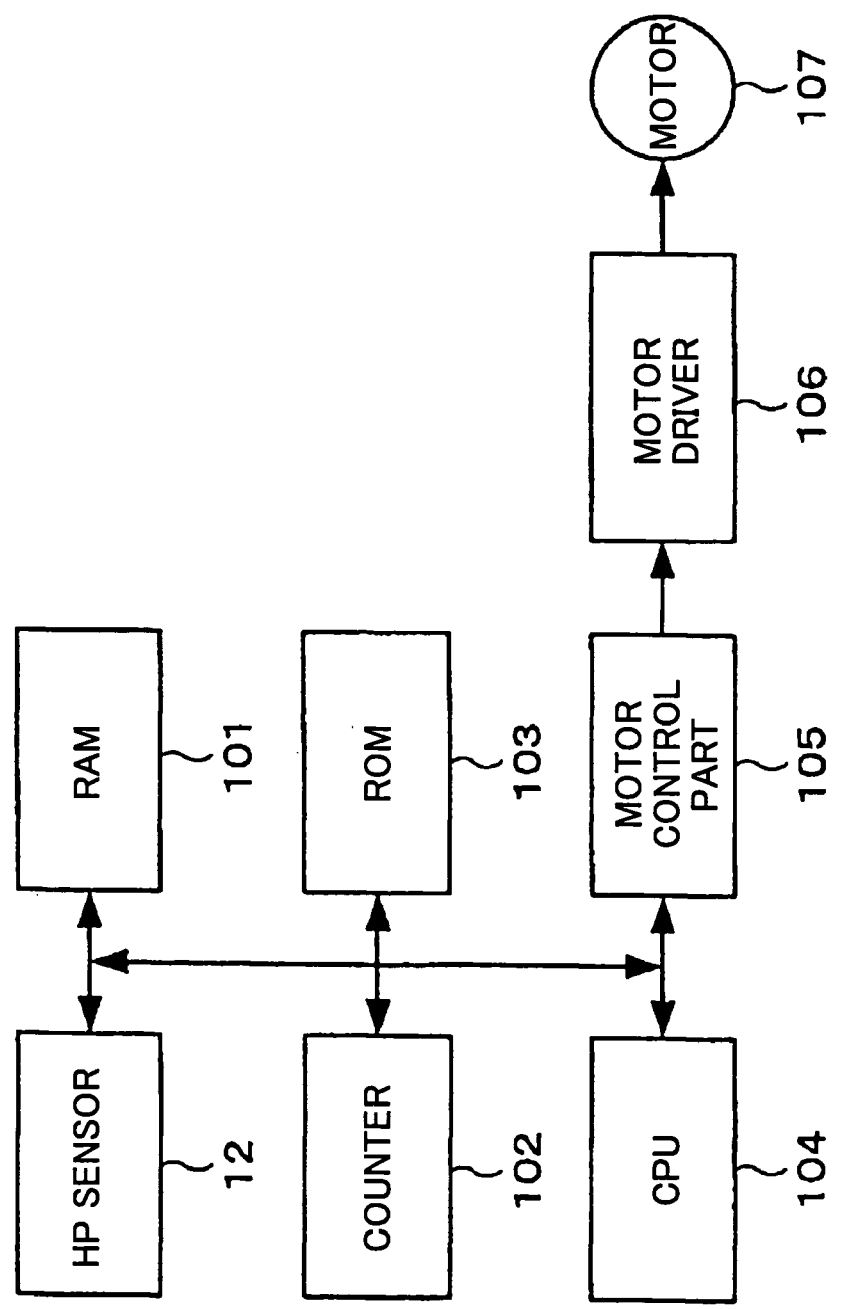
FIG. 22 is a block diagram showing a motor control apparatus in Embodiment 7 of the present invention.

FIG. 22 shows the structure of a motor control apparatus in Embodiment 7 of the present invention. In Embodiment 7, as shown in FIG. 3, the home position mark 11, which represents the reference point, is marked on the transfer belt 18 in Embodiment 1. The home position mark 11 is detected by the sensor 12 as shown in FIG. 4 so as to detect a home position (hereinafter referred to as a "HP") of the transfer belt 18. The sensor 25 as shown in FIGS. 8 through 10 is used as the sensor 12.

That is, Embodiment 7 employs the methods as follows, for example: the method of detecting the HP mark 11 by the reflective sensor 25 facing the surface of the transfer belt 18 at the fixed position as shown in FIG. 8; the method of forming the HP mark 11 on the back of the transfer belt 18, and detecting the HP mark by means of the reflective sensor 25 facing the back of the transfer belt 18 at the fixed position; and the method of arranging the light emitting part 25a and the light receiving part 25b, constituting the HP sensor for detecting marks, to interpose the transfer belt 18 therebetween, and detecting the HP mark 11 by receiving, by means of the light receiving part 25b, the light that is emitted from the light emitting part 25a and passes the part of the transfer belt 18 where the HP mark 11 is marked as shown in FIG. 10.

In FIG. 22, the motor control apparatus includes the HP sensor 12, RAM 101, a counter 102, ROM 103, a CPU 104, a motor control part 105, a motor driver 106, and a motor 107 for driving the transfer belt 18.

The HP sensor 12 is a detection means for detecting the HP mark 11 on the transfer belt 18. A reflective sensor that detects a reflected light from the HP mark 11 may be used for the HP sensor 12, for example. The counter 102 is a measurement means for measuring the time interval elapsed since the output (detection of the HP mark 11) of the HP sensor 12, or the number of drive pulses supplied to the motor 107. The RAM 101 is a memory for storing information of, for example, the stop position of the transfer belt 18. The ROM 103 is a nonvolatile memory for storing one or more programs for performing a series of controls. Information of thickness variation or speed variation of the transfer belt 18 is also stored in the ROM 103. The motor control part 105 controls the motor 107 based on the information of the thickness variation or speed variation of the transfer belt 18. The motor driver 106 is a driver for driving the motor 107. The motor 107 drives the drive shaft of the transfer belt 18.

The drive roller 19 is driven by the motor 107 coupled to the roller shaft. The motor control part 105 controls the rotation speed of the drive shaft of the transfer belt 18 by controlling the rotation speed of the motor 107 via the motor driver 106 based on the information of the thickness variation or speed variation of the transfer belt 18 for one period, which information is measured in advance. Thereby, the motor control part 105 controls the speed of the surface of the transfer belt 18 to be constant.

Practically, the surface speed of the transfer belt 18 is controlled to be constant by varying the speed of the transfer belt 18 by increasing/decreasing the frequency of a pulse that is given to a stepping motor, serving as the motor 107 coupled to the drive shaft of the drive roller 19, in accordance with respective positions dividing the transfer belt 18 in the perimeter direction. When correcting speed variation that synchronizes with the period of rotation of the transfer belt 18, the transfer belt 18 is rotated when starting printing, and a speed control process of the transfer belt 18 is performed by detecting that the HP mark 11 passes the HP sensor 12 and setting the position of the transfer belt 18 at the time to the starting point.

Figure 1:
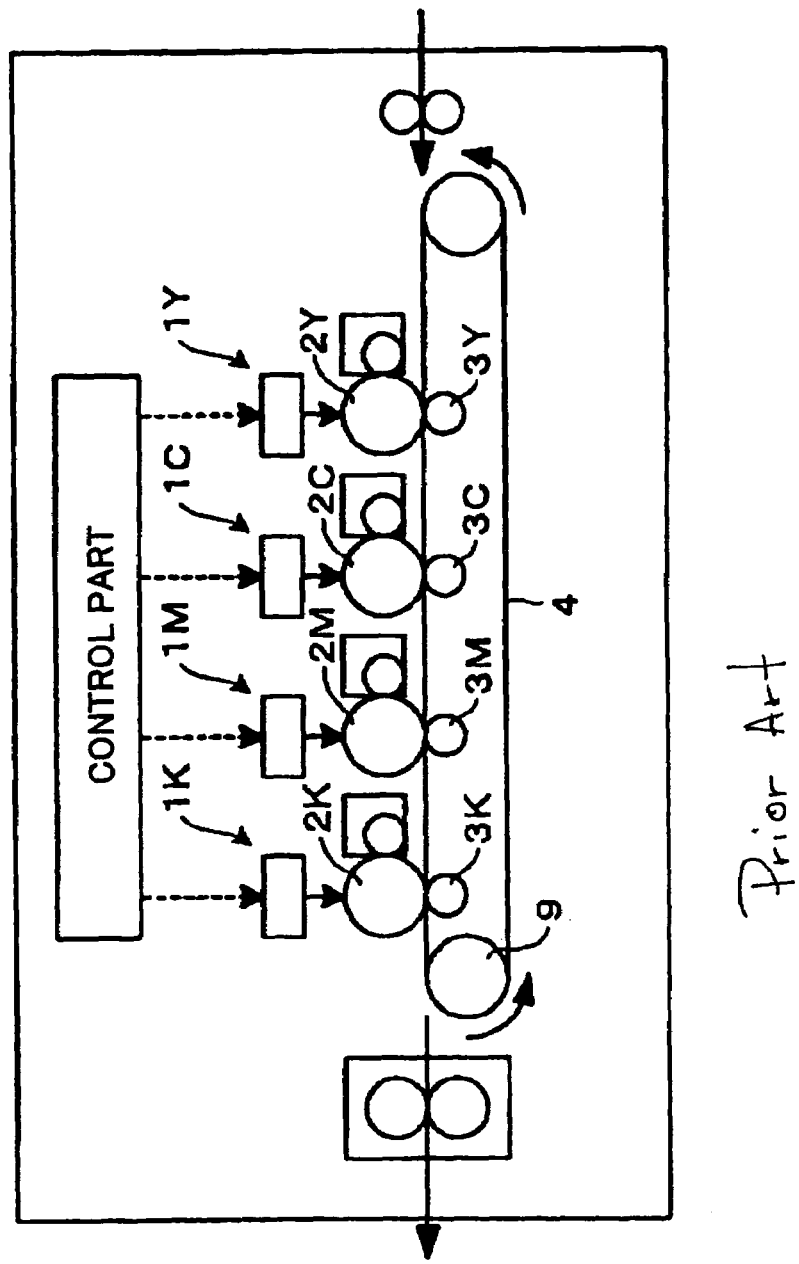
FIG. 1 is a cross-sectional view showing a tandem direct transfer printer.
Figure 2:
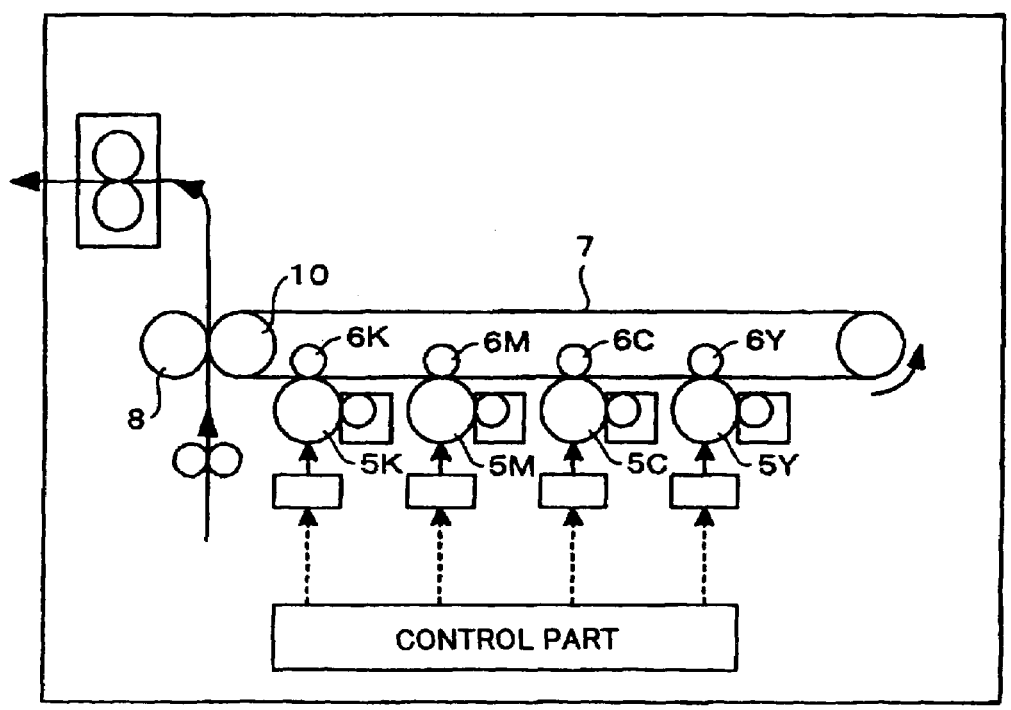
FIG. 2 is a cross-sectional view showing a tandem indirect transfer printer.

In Embodiment 7, the description is given by assuming a paper carrying belt of a direct transfer printer as the transfer belt 18. However, similarly, the present invention may also be applied to an intermediate transfer belt of an indirect transfer printer that temporarily transfers images of respective colors on the transfer belt 7 in a superimposing manner, and simultaneously transfers the images to paper by the secondary transfer part 8 as shown in FIG. 2.

Figure 23:
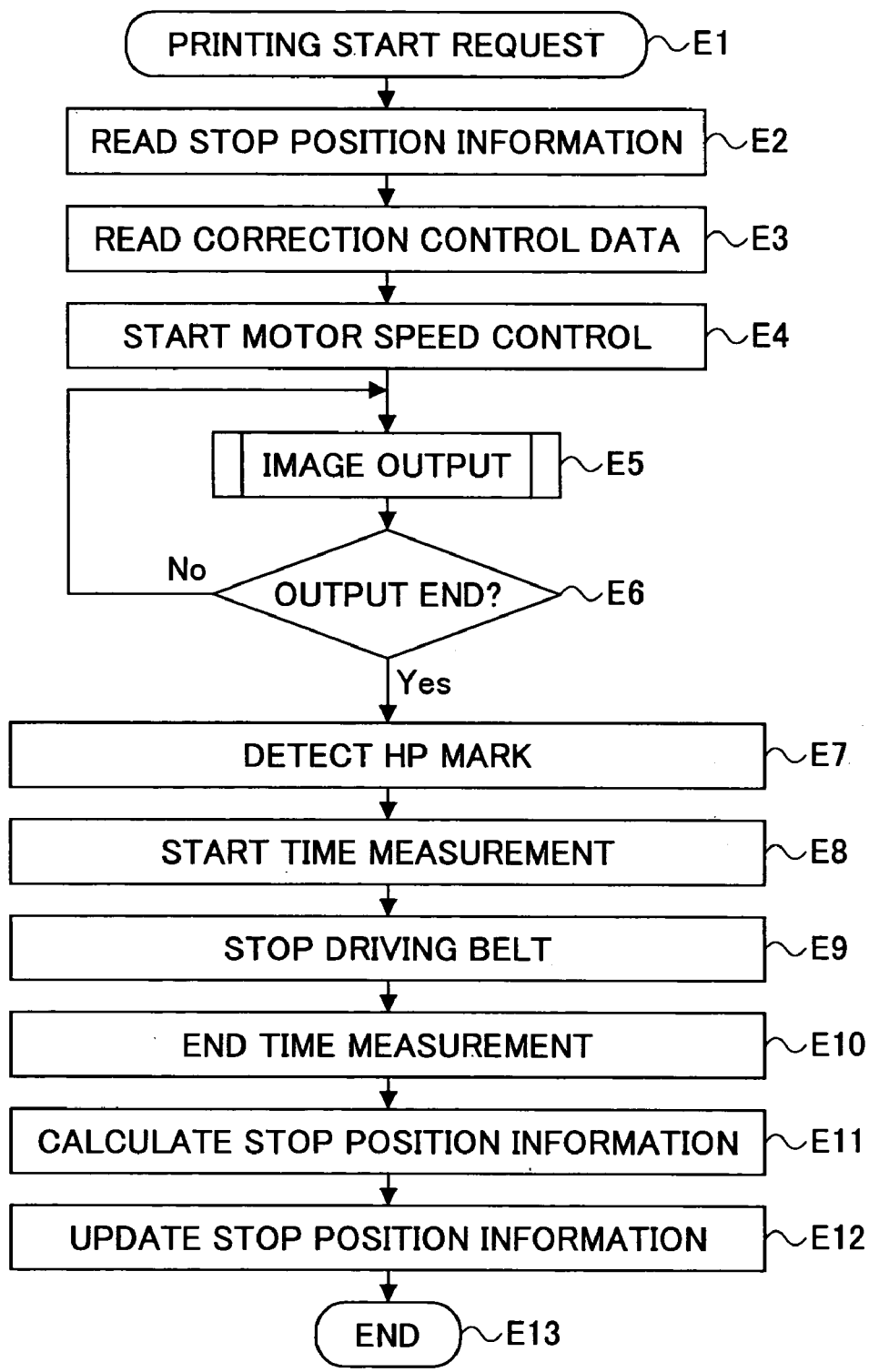
FIG. 23 is a flow chart showing an operation flow in Embodiment 7.
Figure 24:
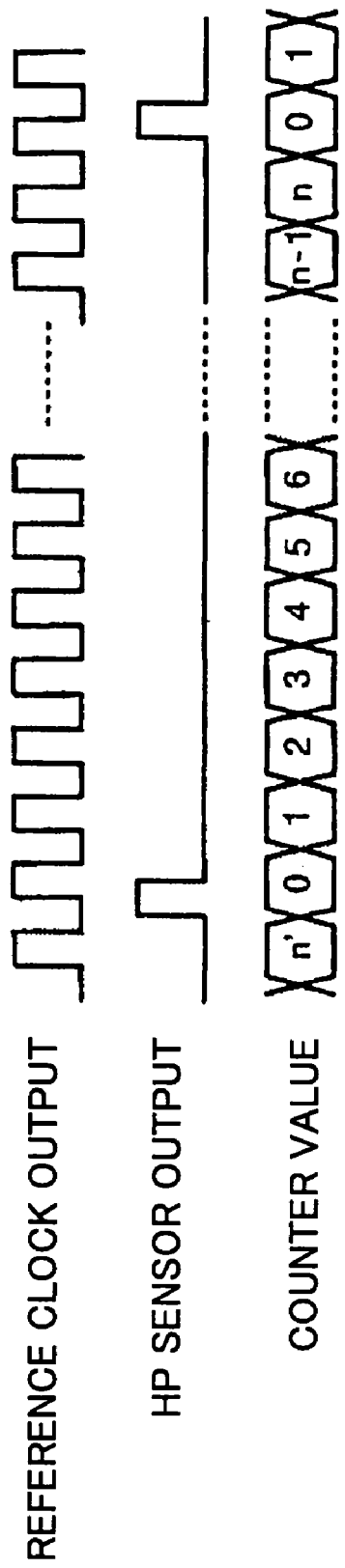
FIG. 24 is a timing chart for explaining an operation of a counter in Embodiment 7.

FIG. 23 is a flow chart for explaining an operation of Embodiment 7. FIG. 24 is a timing chart for explaining an operation of a counter in Embodiment 7. In FIG. 24, a reference clock output, a HP sensor output, and a counter value are shown.

A description is given below of the operation of Embodiment 7 in accordance with the flow chart of FIG. 23.

When a printing start request is issued in step E1, the CPU 104 reads, in step E2, from the RAM 101, which is a temporary storage memory, stop position information of the transfer belt 18 stored at the last time the transfer belt 18 was stopped. In step E3, the CPU 104 reads speed correction control data from the ROM 103, which is a fixed memory.

The information of thickness variation or speed variation of the transfer belt 18, which information is used for speed correction control, is saved in the ROM 103 in the apparatus as follows. That is, when assembling the apparatus, the information is measured for one period from the reference position of the transfer belt 18 by using a high-precision measuring device. The results are saved in the ROM 103. The speed correction control data are associated with respective regions dividing the transfer belt 18. It is possible to read the data of an arbitrary region of the divided regions.

In step E4, the CPU 104 determines the current region which is positioned on the drive roller 19 from the stop position information and a speed correction control data table in the ROM 103. The CPU 104 causes the motor control part 105 to start speed control of the motor 107 by using the speed correction control data by setting the determined region to the starting point.

The motor control part 105 controls the rotation speed of the drive shaft of the transfer belt 18 by performing speed control of the motor 107 based on the above-mentioned speed correction control data. In this case, the motor control part 105 controls the speed of the motor 107 such that speed variation of the transfer belt 18 is reduced or canceled. Thereby, the motor control part 105 performs a process for reducing speed variation of the transfer belt 18.

After starting speed control of the transfer belt 18 based on the speed correction control data, the CPU 104, in step E5, starts an image output process (image forming process) as mentioned above. In step E6, whether the image output process ends is determined. Step E6 is repeated until the decision result in step E6 becomes YES. When the image output process ends (YES in step E6), the CPU 104 detects the HP mark 11 from a detected signal of the HP sensor (detection means) 12 in step E7. In step E8, the CPU 104 causes the counter (measurement means) 102 to start measuring time from the point in time at which the HP sensor 12 detects the HP mark 11. In step E9, the CPU 104 causes the counter 102 to stop measuring time at the stage where the transfer belt 18 is stopped. It is assumed that the time measurement by the counter 102 is performed by using the counter 102 capable of counting the number of reference clocks for one rotation of the transfer belt 18 by using a clock that is internally generated in the CPU 104. In other words, the counter 102, which is the measurement means, measures the number of pulses since an output of the HP sensor 12 by using the reference clock in the system, and outputs the counted value at the time when the transfer belt 18 is stopped. Thereby, the counter 102 measures the elapsed time interval between detection of the HP mark 11 made by the HP sensor 12 and stoppage of the transfer belt 18. When the transfer belt 18 makes one rotation and the next output of the HP sensor 12 is made, the CPU 104 clears the value of the counter 102 and causes the counter 102 to perform time measurement again.

In the flow chart shown in FIG. 23, the description is given assuming that the process from the detection of the HP mark 11 (step E7) to the time measurement (step E10) until the transfer belt 18 is stopped is performed after printing ends. However, the detection of the HP mark 11 by the HP sensor 12 and time measurement thereafter may be performed whenever speed control of the motor 107 is started. In this case, when printing ends and a stop instruction is issued to the motor drive apparatus, it is possible to immediately proceed to a stop operation of the transfer belt 18 without waiting for the next detection of the HP mark 11. Also, it is possible to reduce the time until the transfer belt 18 is stopped.

It is assumed that te represents a time interval measured by the counter 102 from detection of the HP mark 11 until the transfer belt 18 is stopped. In step E11, the CPU 104 calculates the ratio of te to a time interval T for one rotation of the transfer belt 18, and calculates the distance between the stop position of the transfer belt 18 and the HP mark 11 and the stop position with respect to the entire circumference of the transfer belt 18. In step E12, the CPU 104 updates information of stop position of the transfer belt 18 stored in the RAM 101 by the calculated position, and the process ends in step E13. When these operations are performed for the first time, since past stop position information of the transfer belt 18 is not stored in the RAM 101, stop position information of the transfer belt 18 is merely stored in the RAM 101. Since then, however, past stop position information exists in the RAM 101. Thus, including the first time where only storing is performed, step E12 is referred to as update of information. The same applies to the following embodiments.

When calculating the ratio, it is possible to further heighten the accuracy if a transitional delay at the rise of the motor 107 and at stoppage of the transfer belt 18 are considered.

At the next activation of the motor 107, based on the updated stop position information, the CPU 104 reads speed correction control data from the RAM 101, and starts speed control of the motor 107 based on the read speed correction control data.

In this embodiment, it is possible to calculate a stop position of the transfer belt 18 by obtaining a move distance of the transfer belt 18 after the HP mark 11 passes the HP sensor 12 by using the elapsed time te since the HP mark 11 is detected at stoppage of the transfer belt 18.

Hence, at the next activation of the motor 107, it is possible to start speed correction control of the transfer belt 18 without rotating the transfer belt 18 until the HP sensor 12 detects the HP mark 11 of the transfer belt 18. Thus, it is possible to reduce a time required for speed control of the transfer belt 18. Also, it is possible to realize an image forming apparatus that reduces the time to form a first print.

Additionally, since it is not necessary to perform needless rotation of the transfer belt 18, it is possible to extend the life of the transfer belt 18.

Figure 25:
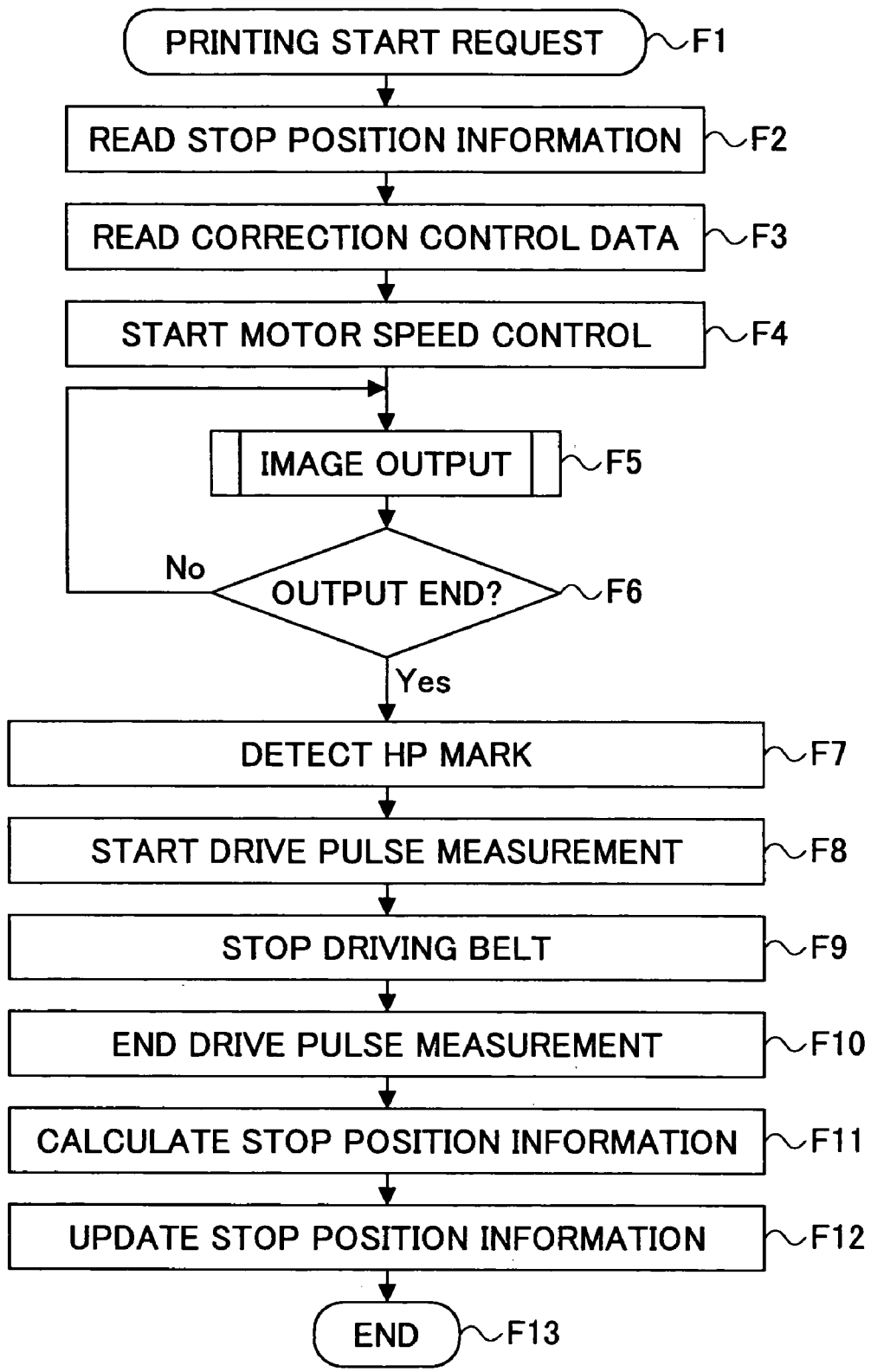
FIG. 25 is a flow chart showing an operation of Embodiment 8 of the present invention.

FIG. 25 is a flow chart showing an operation of Embodiment 8 of the present invention. In Embodiment 8, the operation flow shown in FIG. 25 is performed in Embodiment 7 instead of the operation flow shown in FIG. 23.

When a printing start request is issued in step F1, the CPU 104 reads the stop position information stored in the RAM 101 at the last stoppage of the transfer belt 18 in step F2. In step F3, the CPU 104 reads speed correction control data from the ROM 103.

Information of thickness variation or speed variation of the transfer belt 18, which information is speed correction control data, is saved in the ROM 103 in the apparatus by measuring in advance thickness variation or speed variation for one period from the reference position of the transfer belt 18. The thickness variation or speed variation of the transfer belt 18 are measured by using a high-precision measuring device when assembling the apparatus. The results are saved in the ROM 103.

The speed correction control data are associated with the respective regions dividing the transfer belt 18. It is possible to read the data of an arbitrary region of the divided regions.

In step F4, the CPU 104 obtains the region positioned on the drive roller 19 of the transfer belt 18 from the stop position information and the speed correction control table recorded in the ROM 103, and causes the motor control part 105 to start speed control of the motor 107 by using the speed correction control data with the obtained region as the starting point.

It is assumed that the motor control part 105 controls the rotation speed of the drive shaft of the transfer belt 18 by performing speed control of the motor 107 based on the above-mentioned correction control data. Additionally, it is assumed that the motor control part 105 performs a process for reducing speed variation of the transfer belt 18 by controlling the speed of the motor 107 such that the speed variation of the transfer belt 18 is reduced or canceled.

After causing the motor control part 105 to start the speed control of the transfer belt 18 based on the speed correction control data, the CPU 104 causes the image output process to be started in step F5. In step F6, whether the image output process ends is determined. Step F6 is repeated until the decision result in step F6 becomes YES. When the image output process ends (YES in step F6), the CPU 104 detects the HP mark 11 from a detected signal of the HP sensor 12 in step F7. In step F8, from the time when the HP sensor 12 detects the HP mark 11, the CPU 104 causes the counter 102, serving as the measurement means, to start measuring of the number of pulses given to the motor 107. At the stage where the transfer belt 18 is stopped in step F9, the CPU 104 causes the counter 102 to end measuring the number of pulses in step F10. It is assumed that measurement of the number of pulses is performed by using the counter 102 capable of measuring the number of pulses for driving the transfer belt 18 for one rotation as the measurement means.

The counter 102 measures the number of pulses given to the motor 107 since an output of the HP sensor 12 is made, and outputs the counted value at the time of stoppage of the transfer belt 18. Thereby, the counter 102 outputs the number of pulses from the detection of the HP mark 11 to the stoppage of the transfer belt 18. The number of pulses from the detection of the HP mark 11 to the stoppage of the transfer belt 18, which is the measured result of the counter 102, is referred to as "the number of elapsed pulses".

In the flow chart shown in FIG. 25, the description is given by assuming that measurement of the number of pulses from the detection of the HP mark 11 (step F7) to the stoppage of the transfer belt 18 (step F9) is performed after printing ends. However, the detection of the HP mark 11 by the HP sensor 12 and measurement thereafter of the number of pulses given to the motor 107 may be performed whenever speed control of the motor 107 is started.

In step F11, the CPU 104 calculates the ratio of n to the number of pulses N that are necessary for driving the transfer belt 18 for one rotation, where n is the number of pulses measured by the counter 102, and calculates the distance between the stop position of the transfer belt 18 and the HP mark 11 and the stop position of the transfer belt 18 with respect to the entire circumference of the transfer belt 18. In step F12, the CPU 104 updates the stop position information of the transfer belt 18 in the RAM 101 by the calculated stop position information, and the process ends in step F13.

At the next time the motor 107 is activated, the CPU reads the speed correction control data based on the updated stop position information, and starts speed control of the motor 107 based on the read speed correction control data.

According to Embodiment 8, in addition to the advantages achieved in Embodiment 7, it is possible to detect the stop position of the transfer belt 18 with a good degree of accuracy by calculating the move distance of the transfer belt 18 from the number of pulses given to the motor 107 that drives the transfer belt 18.

Figure 26:
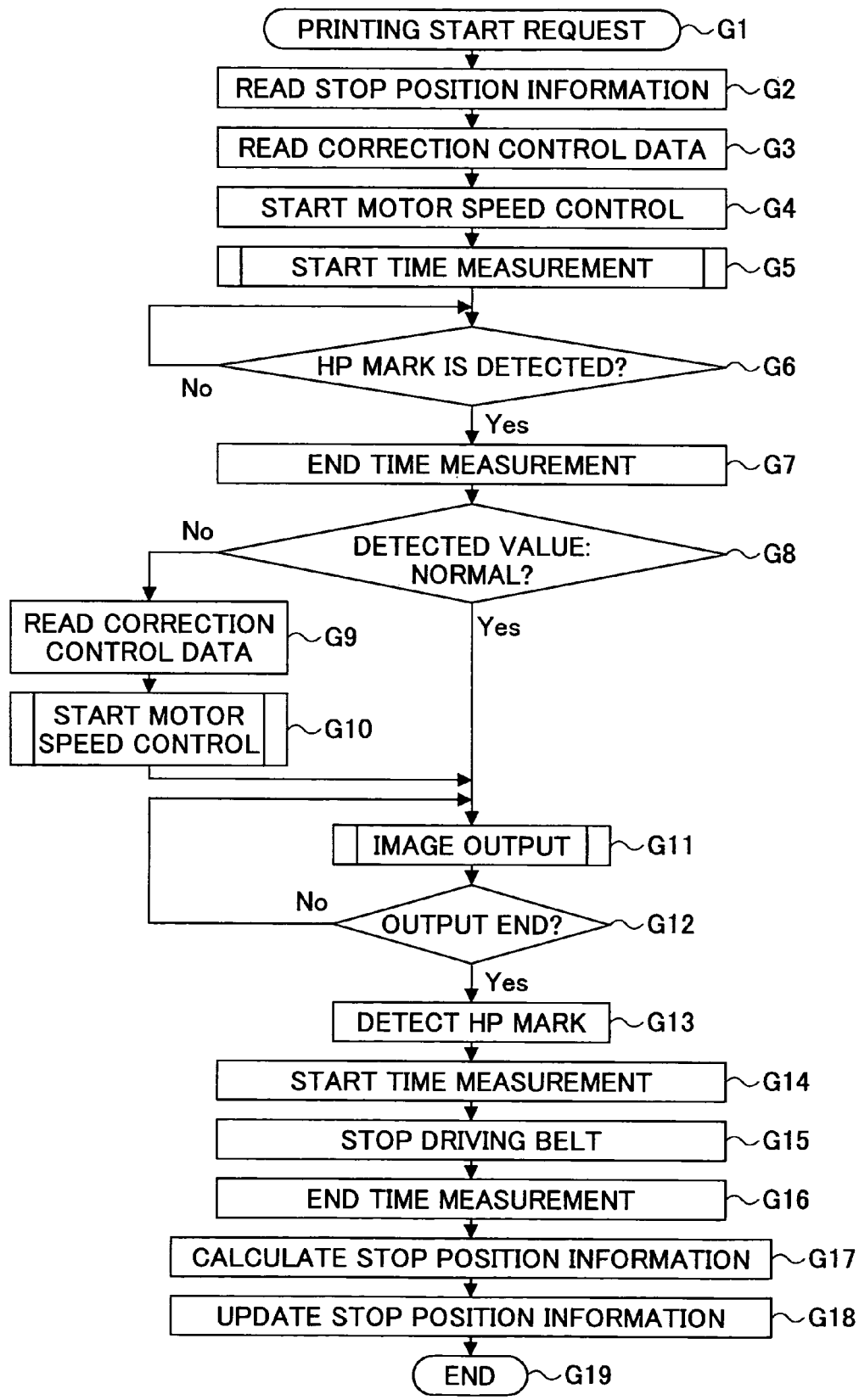
FIG. 26 is a flow chart showing an operation of Embodiment 9 of the present invention.

FIG. 26 is a flow chart showing an operation flow of Embodiment 9 of the present invention. In Embodiment 9, the operation flow shown in FIG. 26 is performed in Embodiment 7 instead of the operation flow shown in FIG. 23.

When a printing start request is issued in step G1, in step G2, the CPU 104 reads the stop position information stored in the RAM 101 at the last stoppage of the transfer belt 18. In step G3, the CPU 104 reads speed correction control data.

Information of thickness variation or speed variation of the transfer belt 18, which information is speed correction control data, is saved in the ROM 103 in the apparatus by measuring in advance the thickness variation or speed variation for one period from the reference position of the transfer belt 18. The thickness variation or speed variation of the transfer belt 18 are measured by using a high-precision measuring device when assembling the apparatus. The results are saved in the ROM 103 in the apparatus.

The speed correction control data are associated with the respective regions dividing the transfer belt 18. It is possible to read the data of an arbitrary region of the divided regions. In step G4, the CPU 104 determines the region of the transfer belt 18 currently positioned on the drive roller 19 from the stop position information and the speed correction control data table, and causes the motor control part 105 to start speed control of the motor 107 by using the speed correction control data with the determined region as the starting point.

It is assumed that, based on the above-mentioned speed correction control data, the motor control part 105 controls the rotation speed of the drive shaft of the transfer belt 18 by performing speed control of the motor 107. Also, it is assumed that the motor control part 105 performs a process for reducing speed variation of the transfer belt 18 by controlling the speed of the motor 107 such that the speed variation of the transfer belt 18 is reduced or canceled.

In step G5, the CPU 104 causes the motor control part 105 to start speed control of the motor 107. Simultaneously, the CPU 104 causes the counter 102 to start measuring the actual time until detection of the HP mark 11 from a detected signal of the HP sensor 12. In step G7, at the stage where the HP mark 11 is detected, the CPU 104 causes the counter 102 to end time measurement.

In step G8, the CPU 104 makes a comparison between an estimated stop position of the transfer belt 18 calculated back from the actual time until the detection of the HP mark 11 from the activation of the motor 107, and the stop position information in the RAM (temporary storage memory) 101 read in step G2, so as to obtain the difference therebetween, for example. Thereby, the CPU 104 determines whether the value of the difference falls within a predetermined range that is defined from permissible errors in image registration. When the value of the difference falls within the predetermined range (YES in step G8), the operation is normal. Thus, in step G11, the process proceeds to the image output process as mentioned above. When the value of the difference is outside the predetermined range (NO in step G8), the current speed correction control of the motor 107 is performed at a position shifted from the regular position. Thus, in step G9, the speed correction control data are read again. In step G10, speed control is started with the position of the HP mark 11 as the basis as mentioned above.

In step G12, whether the image output process ends is determined. When the decision result in step G12 is NO, the process returns to step G11. When the image output process ends (YES in step G12), the CPU 104 detects the HP mark 11 from a detected signal of the HP sensor 12 in step G13. In step G14, from the time when the HP mark 11 is detected, the CPU 104 causes the counter 102 to perform time measurement. When the transfer belt 18 is stopped in step G15, the CPU 104 causes the counter 102 to stop performing time measurement in step G16.

In step G17, the CPU 104 calculates the ratio of te to the time interval T corresponding to one rotation of the transfer belt 18, where te represents the time interval measured by the counter 102 until the transfer belt 18 is stopped since the HP mark 11 is detected. Also, the CPU 104 calculates the distance between the stop position of the transfer belt 18 and the HP mark 11 and the stop position with respect to the entire circumference of the transfer belt 18. In step G18, the stop position information in the RAM 101 is updated by the stop position information obtained in step G17. In step G19, the process ends.

At the next activation of the motor 107, the CPU 104 reads speed correction control data based on the updated stop position information, and starts speed control of the motor 107 based on the read speed correction control data.

Even if detection of the stop position of the transfer belt 18 fails in the operation flow of Embodiment 7 due to load change of the motor 107, noise, and other influence of disturbance, according to Embodiment 9, the function is provided that determines whether the time until the HP mark 11 is detected at the next activation of the motor 107 is a normal value. Hence, it is possible to prevent increase in displacement due to erroneous speed control of the transfer belt 18.

Figure 27:
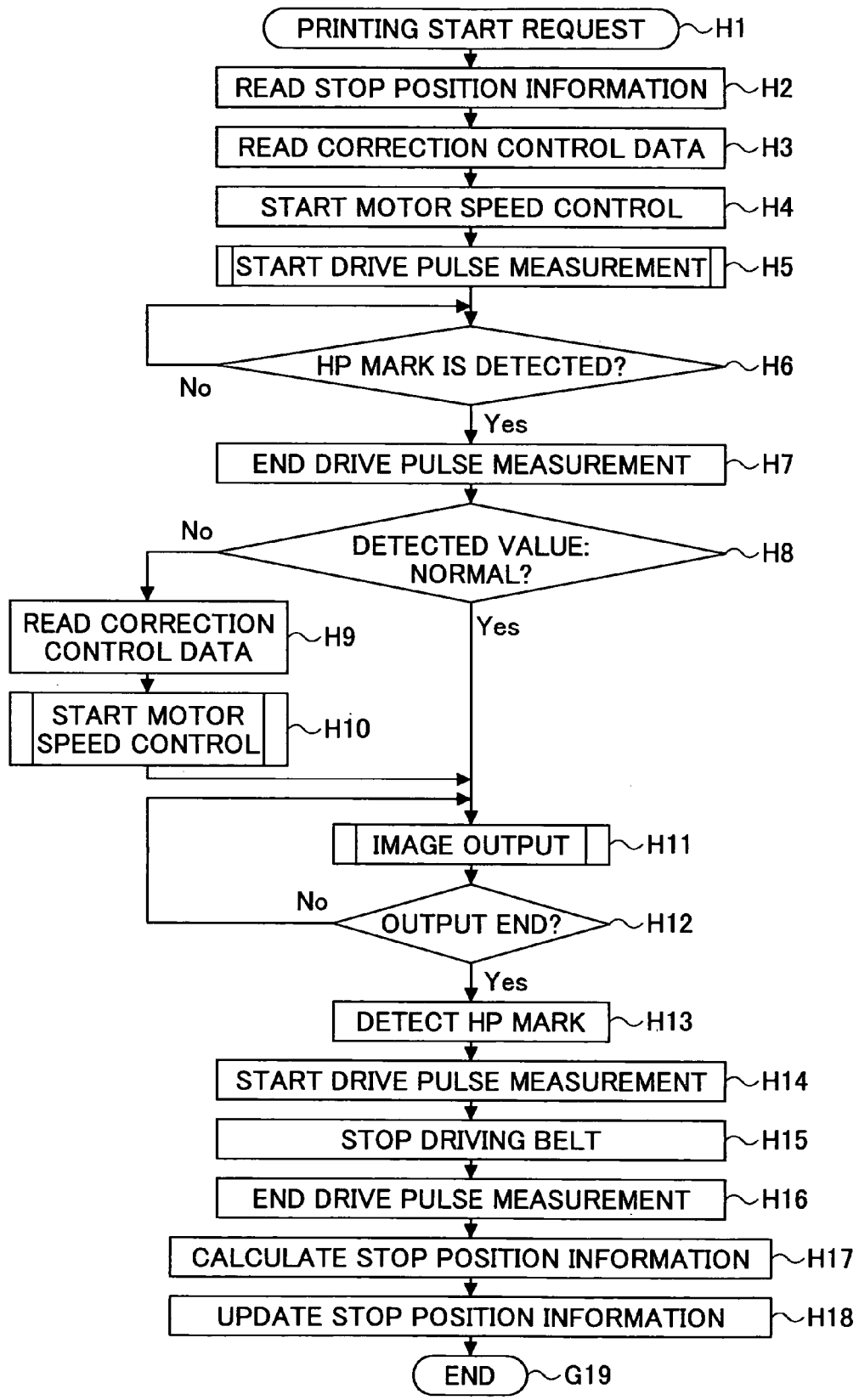
FIG. 27 is a flow chart showing an operation of Embodiment 10 of the present invention.

FIG. 27 is a flow chart showing an operation flow of Embodiment 10 of the present invention. In Embodiment 10, the operation flow shown in FIG. 27 is performed in Embodiment 7 instead of the operation flow shown in FIG. 23.

When a printing start request is issued in step H1, in step H2, the CPU 104 reads from the RAM 101 the stop position information stored therein at the last stoppage of the transfer belt 18. In step H3, the CPU 104 reads speed correction control data.

The information of thickness variation or speed variation of the transfer belt 18, which information is speed correction control, is saved in the ROM 103 in the apparatus by measuring in advance the thickness variation or speed variation for one period from the reference position of the transfer belt 18. The thickness variation or speed variation is measured by using a high-precision measuring device when assembling the apparatus. The results are saved in the ROM 103 in the apparatus.

The speed correction control data are associated with the respective regions dividing the transfer belt 18. It is possible to read the data of an arbitrary region of the divided regions.

In step H4, the CPU 104 determines the region of the transfer belt 18 currently positioned on the drive roller 19 from the stop position information and the speed correction control data table, and causes the motor control part 105 to start speed control of the motor 107 by using the speed correction control data with the determined region as the starting point.

It is assumed that the motor control part 105 controls the rotation speed of the drive shaft of the transfer belt 18 by performing speed control of the motor 107 based on the above-mentioned speed correction control data. Also, it is assumed that the motor control part 105 performs a process for reducing speed variation of the transfer belt 18 by controlling the speed of the motor 107 such that the speed variation of the transfer belt 18 is reduced or canceled.

In step H5, the CPU 104 causes the motor control part 105 to start speed control of the motor 107. Simultaneously, the CPU 104 causes the counter.102 to start measuring the number of actual pulses (number of pulses given to the motor 107) until detection of the HP mark 11 from a detected signal of the HP sensor 12. In step H6, whether the HP mark 11 is detected is determined. Step H6 is repeated until the decision result in step H6 becomes YES. In step H7, at the stage where the HP mark 11 is detected, the CPU 104 causes the counter 102 to end measuring the number of the pulses.

In step H8, the CPU 104 makes a comparison between the estimated belt stop position that is calculated back from the number of actual pulses until detection of the HP mark 11 since activation of the motor 107 and the stop position information in the RAM (temporary storage memory) 101 read in step H2, so as to obtain the difference therebetween. Thereby, the CPU 104 determines whether the value of the difference falls within a predetermined range. When the value of the difference falls within the predetermined range (YES in step H8), the operation is normal. Thus, in step H11, the process proceeds to the image output process as mentioned above. When the value of the difference is outside the predetermined range (NO in step H8), the current speed correction control is performed at a position shifted from the regular position. Thus, in step H9, the CPU 104 reads the correction control data again. In step H10, the CPU 104 causes the motor control part 105 to start speed control of the motor 107 with the position of the HP mark 11 as the basis.

In step H12, whether the image output process ends is determined. When the decision result in step H12 is NO, the process returns to step H11. When the image output process ends (YES in step H12), in step H13, the CPU 104 detects the HP mark 11 from a detected signal of the HP sensor 12. In step H14, from the stage where the HP mark 11 is detected by the HP sensor 12, the CPU 104 causes the counter 102 to start measuring the number of pulses. At the stage where the transfer belt 18 is stopped in step H15, the CPU 104, in step H16, causes the counter 102 to end measuring the number of pulses. The number of pulses obtained as a measuring result of the counter 102 is referred to as "the number of elapsed pulses".

In step H17, the CPU 104 calculates the ratio of n to the number of pulses N necessary for driving the transfer belt 18 for one rotation, where n represents the number of elapsed pulses, and calculates the distance between the stop position of the transfer belt 18 and the HP mark 11 and the stop position with respect to the entire circumference of the transfer belt 18. In step H18, the stop position information of the transfer belt 18 in the RAM 101 is updated by the stop position information obtained in step H17. In step H19, the process ends.

At the next activation of the motor 107, the CPU 104 reads speed correction control data based on the updated stop position information, and causes speed control of the motor 107 to be started based on the read speed correction control data.

Even if detection of a stop position of the transfer belt 18 fails in the operation flow in Embodiment 8 due to load change of the motor 107, noise, and influence of other disturbance, according to Embodiment 10, the function is provided that determines whether the number of pulses given to the motor 107 until the HP mark 11 is detected at the next activation of the motor 107 is a normal value. Hence, it is possible to prevent increase in displacement of the transfer belt 18 due to erroneous speed control of the transfer belt 18.

In Embodiment 7, the stop position of the transfer belt 18 is calculated from the elapsed time te, and the calculated stop position is stored in the RAM 101. In this case, it is convenient if the elapsed time te per se is simultaneously stored in the RAM 101.

In a case where the transfer belt 18 is temporarily stopped after the HP sensor detects the HP mark 11, and the HP sensor 12 detects the HP mark 11 after the transfer belt 18 is driven again, the sum Tt of the time interval te from detection of the HP mark 11 until the stoppage of the transfer belt 18 and a time interval ts since the transfer belt 18 is driven again until the HP sensor 12 detects the HP mark 11 is approximately constant irrespective of the stop position even if transient phenomena are considered. Therefore, it is possible for the CPU 104 to store the elapsed time te as the storage time, and when the actual time interval ts since the transfer belt 18 is driven again until the HP mark 11 is detected is obtained, to obtain ts'=Tt−te where ts' is a predicted value of ts. Then, comparing the actual time ts and the predicted time ts', it is possible for the CPU 104 to determine whether the ts is a normal value. In this manner, it is possible to immediately determine whether the ts is a normal value while saving the trouble of conversion into a stop position of the transfer belt 18. The CPU 104 may calculate and store the predicted time ts' instead of storing ts per se. In this case, since it is not necessary to calculate ts' every time, it is possible to perform the comparison faster.

In Embodiment 8, the stop position of the transfer belt 18 is calculated from the number of the elapsed pulses, and the calculated value is stored. On this occasion, it is convenient if the number of elapsed time per se is simultaneously stored. The method and effects thereof are similar to those in the case where the elapsed time te is stored.

It is effective to obtain and store a predicted number of pulses as well as to obtain and store the predicted time ts' since the transfer belt 18 is driven again until detection of the HP mark 11.

Embodiment 11 of the present invention is described below with reference to the flow chart shown in FIG. 23. In Embodiment 11, when stopping the transfer belt 18 in Embodiment 7, the CPU 104 detects the HP mark 11 from a detected signal of the HP sensor 12 in step E7. When measuring variation until the driving of the transfer belt 18 is stopped in step E9, the CPU 104 starts a process for stopping the transfer belt 18 after a delay time elapses since the HP sensor 12 detects the HP mark 11, or after a predetermined number of pulses for delay are applied to the motor 107. In step E11, assuming that the elapsed time measured by the counter 102 is a value obtained by adding thereto the set delay time or the time interval corresponding to the number of pulses for delay, the CPU 104 calculates stop position information by using the value.

A description is given below of Embodiment 12 of the present invention. Embodiment 12 is described by using the flow chart of FIG. 25, which shows the operation of Embodiment 8. That is, in Embodiment 12, when stopping the motor 107 in Embodiment 8, the CPU 104 detects the HP mark 11 from a detected signal of the HP sensor 12 in step F7. When measuring the number of pulses until the transfer belt 18 is stopped in step F9, the CPU 104 starts a process for stopping the transfer belt 18 after a delay time elapses since the HP mark 11 is detected, or after a predetermined number of pulses for delay are applied to the motor 107. Assuming that the number of elapsed pulses measured by the counter 102 is a value obtained by adding thereto the number of pulses corresponding to the set delay time or the number of pulses for delay, in step F11, the CPU 104 calculates stop position information by using the value.

In each of Embodiments 11 and 12, the CPU 104 controls the delay time or number of pulses for delay between detection of the HP mark 11 and the start of the process for stopping the transfer belt 18 (hereinafter collectively referred to as "delay") such that the delay does not exceed the value for one rotation of the transfer belt 18 by increasing the time corresponding to a certain amount of movement of the transfer belt 18, or increasing the number of pulses each time, and when the value reaches that for one rotation of the transfer belt 18, clearing the delay to be 0. Thereby, it is possible to change contact positions between the transfer belt 18 and a support roller etc. each time. If the certain amount of movement of the transfer belt 18 is set to, for example, a value corresponding to equal to or greater than a half of the circumference of a roller having the largest radius among belt support rollers, a probability that the same part of the transfer belt 18 is subjected to deformation of the same curvature becomes small, which is a good result.

Additionally, it is possible to vary the stop position of the transfer belt 18 by randomly varying the delay by using a random number generator. It is also possible to use a pseudo-random number generator having a low degree of accuracy, since strict randomness is not required. However, useless rotation is increased unless the delay is controlled not to exceed a value corresponding to one rotation of the transfer belt 18.

According to Embodiments 11 and 12, when stopping the transfer belt 18, by setting the stop position of the transfer belt 18 to the position different from that of the last time, it is possible to change the positions at which the transfer belt 18 contacts the support rollers. Hence, shape variation of the transfer belt 18 is less likely to occur. Consequently, it is possible to reduce speed variation caused by shape variation of the transfer belt 18.

In addition, since the position is varied at which the transfer belt 18 contacts a photosensitive drum at stoppage, degradation of the transfer belt 18 in a specific part caused by difference in speed at activation is reduced. Thus, it is possible to extend the life of the transfer belt 18.

In the above-mentioned embodiments, the present invention is applied to direct transfer printers. However, the present invention may also be applied as well to image forming apparatuses such as facsimile machines, tandem copying machines, and indirect transfer printers that temporarily form images on the transfer belt 7 and transfer the images to paper at a time by the secondly transfer apparatus 8 as shown in FIG. 2. In this case, it is possible to reduce the time to form a first image. Additionally, the present invention may be applied as well to apparatuses that perform speed control of a belt such as a carrying belt instead of the transfer belt as in the above-mentioned embodiments. In this case, it is possible to reduce the time required until speed control of the belt.

The present invention is not limited to the specifically disclosed embodiments, and variations and modifications may be made without departing from the scope of the present invention.

The present application is based on Japanese priority applications No. 2002-370124 filed on Dec. 20, 2002, No. 2003-049674 filed on Feb. 26, 2003, and No. 2003-380385 filed on Nov. 10, 2003, the entire contents of which are hereby incorporated by reference.

What is claimed is:

1. A belt driver, comprising:
   a belt having a constant number of regions dividing said belt in a perimeter direction thereof;
   a plurality of marks having different widths in the perimeter direction and formed in said respective regions of said belt;
   a sensor detecting said marks on said belt; and
   a storage part storing in advance prior to an image formation request a relationship between position information of said belt and speed variation of said belt for one rotation of said belt,
   wherein speed variation of said belt is reduced by correcting drive speed of said belt based on the relationship, and
   wherein a position of said belt is detected from a time required for one of said marks to pass said sensor, and speed correction control of said belt is performed in accordance with the detected position.

2. The belt driver of claim 1, wherein said marks are formed prior to a time that image formation is requested.

3. The belt driver of claim 1, the information stored in said storage part indicates for each position a corresponding speed variation of said belt.

4. A belt driver, comprising:
   a belt having a constant number of regions dividing said belt in a perimeter direction thereof;
   a plurality of linear marks having different widths in a main scan direction and formed in said respective regions of said belt;
   a sensor detecting said marks on said belt; and
   a storage part storing in advance prior to an image formation request a relationship between position information of said belt and speed variation of said belt for one rotation of said belt,
   wherein speed variation of said belt is reduced by correcting drive speed of said belt based on the relationship, and
   wherein a position of said belt is detected by comparing a predetermined value with a detected value of said sensor, and speed correction control of said belt is performed in accordance with the detected position.

5. A belt driver, comprising:
a belt;
one or more marks on said belt;
a plurality of sensors that detects said marks on said belt; and
a storage part storing in advance prior to an image formation request a relationship between position information of said belt and speed variation of said belt for one rotation of said belt,
wherein speed variation of said belt is reduced by correcting drive speed of said belt based on the relationship, and
wherein a position of said belt is detected by detecting one of said marks by one of said sensors, and speed correction control of said belt is performed in accordance with the detected position.

6. An image forming apparatus, comprising:
a belt driver comprising:
a belt having a constant number of regions dividing said belt in a perimeter direction thereof;
a plurality of linear marks having different width in a main scan direction and formed in said respective regions of said belt;
a sensor detecting said marks on said belt; and
a storage part storing in advance prior to an image formation request a relationship between position information of said belt and speed variation of said belt for one rotation of said belt,
wherein speed variation of said belt is reduced by correcting drive speed of said belt based on the relationship, and
wherein a position of said belt is detected by comparing a predetermined value with a detected value of said sensor, and speed correction control of said belt is performed in accordance with the detected position.

7. An image forming apparatus, comprising:
a belt driver comprising:
a belt;
one or more marks on said belt;
a plurality of sensors that detects said marks on said belt; and
a storage part storing in advance prior to an image formation request a relationship between position information of said belt and speed variation of said belt for one rotation of said belt,
wherein speed variation of said belt is reduced by correcting drive speed of said belt based on the relationship, and
wherein a position of said belt is detected by detecting one of said marks by one of said sensors, and speed correction control of said belt is performed in accordance with the detected position.

8. A belt driver, comprising:
a belt having a constant number of regions dividing said belt in a perimeter direction thereof;
a plurality of marks having different widths in the perimeter direction and formed in said respective regions of said belt;
sensing means for detecting said marks on said belt; and
storage means for storing in advance prior to an image formation request a relationship between position information of said belt and speed variation of said belt for one rotation of said belt,
wherein speed variation of said belt is reduced by correcting drive speed of said belt based on the relationship, and
wherein a position of said belt is detected from a time required for one of said marks to pass said sensing means, and speed correction control of said belt is performed in accordance with the detected position.

9. A belt driver, comprising:
a belt having a constant number of regions dividing said belt in a perimeter direction thereof;
a plurality of linear marks having different widths in a main scan direction and formed in said respective regions of said belt;
sensing means for detecting said marks on said belt; and
a storing means for storing in advance prior to an image formation request a relationship between position information of said belt and speed variation of said belt for one rotation of said belt,
wherein speed variation of said belt is reduced by correcting drive speed of said belt based on the relationship, and
wherein a position of said belt is detected by comparing a predetermined value with a detected value of said sensing means, and speed correction control of said belt is performed in accordance with the detected position.

10. A belt driver, comprising:
a belt;
one or more marks on said belt;
a plurality of sensing means for detecting said marks on said belt; and
storage means for storing in advance a prior to an image formation request relationship between position information of said belt and speed variation of said belt for one rotation of said belt,
wherein speed variation of said belt is reduced by correcting drive speed of said belt based on the relationship, and
wherein a position of said belt is detected by detecting one of said marks by one of said sensing means, and speed correction control of said belt is performed in accordance with the detected position.

11. An image forming apparatus, comprising:
a belt driver comprising:
a belt having a constant number of regions dividing said belt in a perimeter direction thereof;
a plurality of linear marks having different width in a main scan direction and formed in said respective regions of said belt;
sensing means for detecting said marks on said belt; and
storage means for storing in advance prior to an image formation request a relationship between position information of said belt and speed variation of said belt for one rotation of said belt,
wherein speed variation of said belt is reduced by correcting drive speed of said belt based on the relationship, and
wherein a position of said belt is detected by comparing a predetermined value with a detected value of said sensing means, and speed correction control of said belt is performed in accordance with the detected position.

12. An image forming apparatus, comprising:
a belt driver comprising:
a belt;
one or more marks on said belt;
a plurality of sensing means for detecting said marks on said belt; and storage means for storing in advance prior to an image formation request a relationship between position information of said belt and speed variation of said belt for one rotation of said belt, wherein speed variation of said belt is reduced by correcting drive speed of said belt based on the relationship, and wherein a position of said belt is detected by detecting one of said marks by one of said sensing means, and speed correction control of said belt is performed in accordance with the detected position.

13. A method of driving a belt, comprising the steps of:

forming a constant number of regions on said belt, said regions dividing said belt in a perimeter direction thereof;

forming a plurality of marks having different widths in the perimeter direction in said respective regions of said belt;

detecting said marks on said belt by a sensor;

storing in advance prior to an image formation request a relationship between position information of said belt and speed variation of said belt for one rotation of said belt, reducing speed variation of said belt by correcting drive speed of said belt based on the relationship, and detecting a position of said belt from a time required for one of said marks to pass said sensor, and performing speed correction control of said belt in accordance with the detected position.

14. A method of driving a belt, comprising the steps of:

forming a constant number of regions on said belt, said regions dividing said belt in a perimeter direction thereof;

forming a plurality of linear marks having different widths in a main scan direction in said respective regions of said belt;

detecting said marks on said belt by a sensor; and storing in advance prior to an image formation request a relationship between position information of said belt and speed variation of said belt for one rotation of said belt, reducing speed variation of said belt by correcting drive speed of said belt based on the relationship, and detecting a position of said belt by comparing a predetermined value with a detected value of said sensor, and performing speed correction control of said belt in accordance with the detected position.

15. A method of driving a belt, comprising the steps of:

forming one or more marks on said belt;

detecting said marks on said belt by a plurality of sensors; and storing in advance prior to an image formation request a relationship between position information of said belt and speed variation of said belt for one rotation of said belt, reducing speed variation of said belt by correcting drive speed of said belt based on the relationship, and detecting a position of said belt by detecting one of said marks by one of said sensors, and performing speed correction control of said belt in accordance with the detected position.

* * * * *